United States Patent
Kim

(10) Patent No.: US 11,173,594 B2
(45) Date of Patent: Nov. 16, 2021

(54) ROBOT

(71) Applicant: LG ELECTRONICS INC., Seoul (KR)

(72) Inventor: Moonchan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 16/421,969

(22) Filed: May 24, 2019

(65) Prior Publication Data

US 2019/0389051 A1    Dec. 26, 2019

(30) Foreign Application Priority Data

Jun. 25, 2018   (KR) ........................ 10-2018-0072893

(51) Int. Cl.
| | | |
|---|---|---|
| *B25J 1/00* | (2006.01) | |
| *B25J 9/00* | (2006.01) | |
| *B25J 9/16* | (2006.01) | |
| *B25J 11/00* | (2006.01) | |
| *B25J 13/00* | (2006.01) | |
| *B25J 13/08* | (2006.01) | |

(52) U.S. Cl.
CPC ........... *B25J 9/0009* (2013.01); *B25J 9/0003* (2013.01); *B25J 9/162* (2013.01); *B25J 9/1666* (2013.01); *B25J 9/1697* (2013.01); *B25J 11/008* (2013.01); *B25J 13/003* (2013.01); *B25J 13/006* (2013.01); *B25J 13/089* (2013.01)

(58) Field of Classification Search
CPC ........ B25J 9/0009; B25J 9/0003; B25J 9/162; B25J 9/1666; B25J 9/1697; B25J 11/008; B25J 13/003; B25J 13/006; B25J 13/089

USPC .......................................................... 700/253
See application file for complete search history.

(56) References Cited

U.S. PATENT DOCUMENTS

| | | | |
|---|---|---|---|
| 7,748,670 B1 * | 7/2010 | Veldez | ................... F16M 13/02 |
| | | | 248/181.1 |
| 10,485,124 B2 * | 11/2019 | Yu | ......................... H05K 5/0017 |
| 2008/0095395 A1 | 4/2008 | Pieklik | |
| 2012/0173018 A1 | 7/2012 | Allen | |

(Continued)

FOREIGN PATENT DOCUMENTS

| | | |
|---|---|---|
| CN | 105364933 | 10/2017 |
| DE | 92 00 618 | 4/1992 |

(Continued)

OTHER PUBLICATIONS

European Search Report dated Oct. 2, 2019 issued in EP Application No. 19157172.8.

(Continued)

*Primary Examiner* — Thomas E Worden
*Assistant Examiner* — Tiffany P Ohman
(74) *Attorney, Agent, or Firm* — Ked & Associates, LLP

(57) ABSTRACT

A robot includes a base, a spin body rotatably connected to the base, a tilting base tiltably connected at a tilting shaft to the spin body, a first tilting housing to which the tilting base is fixed therein, a second tilting housing which is fastened to the first tilting housing and to which the tilting base is fixed therein, and a tilting supporter connecting an inner side of the first tilting housing and an inner side of the second tilting housing. The tilting supporter is disposed at a position through which a rotational axis of the spin body passes.

20 Claims, 18 Drawing Sheets

(56) References Cited

U.S. PATENT DOCUMENTS

| | | | |
|---|---|---|---|
| 2012/0197439 | A1 | 8/2012 | Wang et al. |
| 2014/0277735 | A1 | 9/2014 | Breazeal |
| 2016/0114480 | A1 | 4/2016 | Krumbacher et al. |
| 2016/0188977 | A1 | 6/2016 | Kearns |
| 2017/0242478 | A1 | 8/2017 | Ma |
| 2017/0312913 | A1 | 11/2017 | Cousins |
| 2017/0363932 | A1* | 12/2017 | Lim ................. G03B 17/02 |
| 2018/0241938 | A1* | 8/2018 | Buibas .............. B25J 9/1679 |
| 2018/0364870 | A1 | 12/2018 | Mei |
| 2018/0376069 | A1 | 12/2018 | Makino |
| 2019/0126157 | A1* | 5/2019 | Hayashi ............... A63H 3/28 |
| 2019/0143528 | A1 | 5/2019 | Hayashi |
| 2019/0275680 | A1 | 9/2019 | Zhuang et al. |
| 2019/0329418 | A1 | 10/2019 | Sutherland |

FOREIGN PATENT DOCUMENTS

| | | |
|---|---|---|
| DE | 10 2013 20679 | 10/2014 |
| JP | 2003-145476 | 5/2003 |
| JP | 2005-279895 | 10/2005 |
| KR | 10-2005-0063113 | 6/2005 |
| KR | 10-2014-0040094 | 4/2014 |
| KR | 10-2016-0034243 | 3/2016 |
| KR | 10-1740704 | 6/2017 |
| KR | 10-2017-0097581 | 8/2017 |
| WO | WO 2018/008385 | 1/2018 |
| WO | WO 2018/016461 | 1/2018 |
| WO | WO 2018/051134 | 3/2018 |

OTHER PUBLICATIONS

Korean Office Action dated Dec. 6, 2019 issued in KR Application No. 10-2018-0072869.
Korean Office Action dated Dec. 10, 2019 issued in KR Application No. 10-2018-0072893.
European Search Report dated Jan. 3, 2020 issued in EP Application No. 19181210.6.
U.S. Appl. No. 16/421,969, filed May 24, 2019.
U.S. Appl. No. 16/422,028, filed May 24, 2019.
United States Office Action dated Jul. 2, 2021 issued in U.S. Appl. No. 16/422,028.

* cited by examiner

ROBOT

CROSS-REFERENCE TO RELATED APPLICATIONS

The present application claims priority under 35 U.S.C. 119 and 35 U.S.C. 365 to Korean Patent Application No. 10-2018-0072893 filed on Jun. 25, 2018, which is hereby incorporated by reference in its entirety. This application is also related to U.S. application Ser. No. 16/422,028 filed May 24, 2019, whose entire disclosure is also hereby incorporated by reference.

BACKGROUND

Field

The present disclosure relates to a robot.

Background

Robots may provide output visual information and/or auditory information to users. For example, a robot may communicate with humans by outputting audio content and/or by performing gestures. Certain robots may include sections that move three-dimensionally, such as sections that are panned or tilted, to perform more complicated gestures or to perform function.

An example of a robot having a three-dimensional moving section is described in Korean Patent Application Publication No. 10-2014-0040094 A (published on Apr. 2, 2014). This robot includes a head supporting an interfacing module, a body, and a neck that connects the head to the body. The robot further includes a rotator that turns the head relative to the body, and a tilting mechanism that tilts the head by a predetermined angle relative to the body and independently of the rotator. The tilt mechanism includes a tilter motor to move the head in an angle range of +/−90 degrees with respect to a Z axis (e.g., a horizontal axis extending in front-to-back direction).

The above reference is incorporated by reference herein where appropriate for appropriate teachings of additional or alternative details, features and/or technical background

BRIEF DESCRIPTION OF THE DRAWINGS

Embodiments will be described in detail with reference to the following drawings in which reference numerals reference to like elements and, wherein.

DETAILED DESCRIPTION

Figure 1:
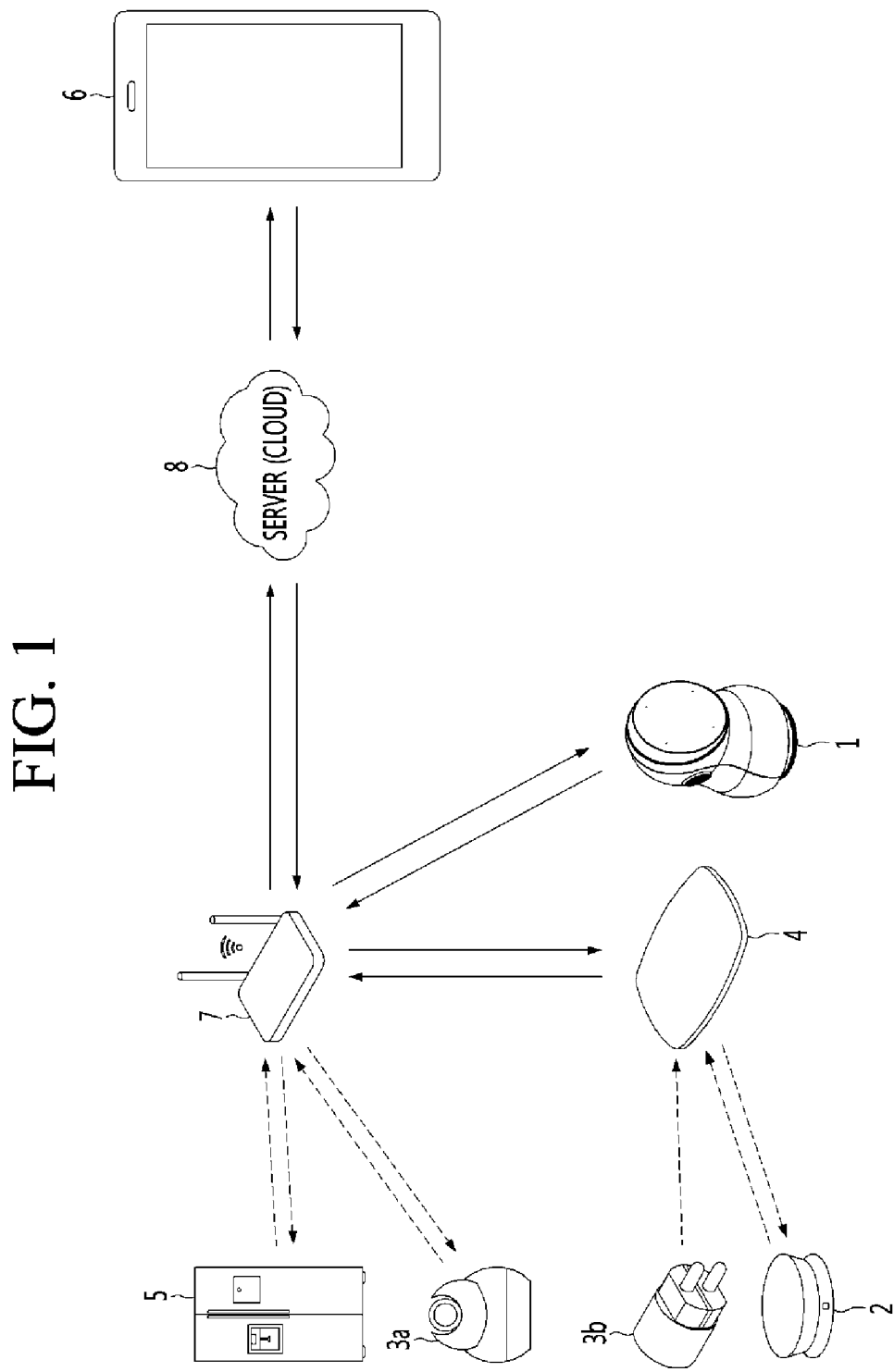
FIG. 1 is a view illustrating an example of a network system to which a robot according to an embodiment applied.
Figure 2:
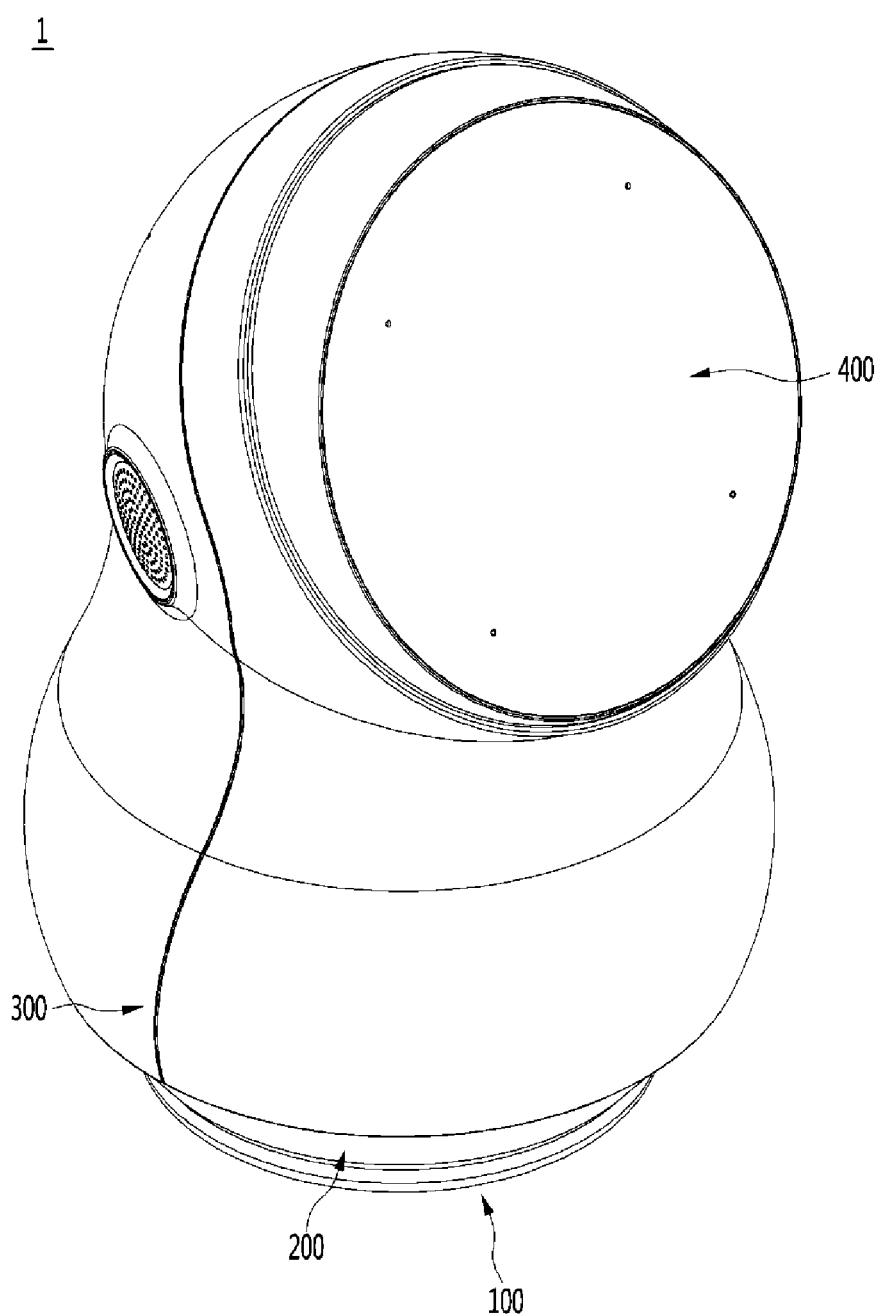
FIG. 2 is a perspective view of a robot according to an embodiment.

FIG. 1 is a view illustrating an example of a network system to which a robot 1 according to an embodiment may be applied. As illustrated in FIG. 1, a network system may include a robot (also referred to as a hub robot) 1 that transmits information via a wired network or a wireless network, various accessories or user devices 2, 3a, and 3b, a gateway 4, a terminal 6, an access point 7, and a server 8. The network may be established based on various communications technologies or protocols, such as Wi-Fi®, Ethernet, Zigbee, Z-wave, or Bluetooth®.

Each of the robot 1, the accessories 2, 3a, and 3b, the gateway 4, and the access point 7 may include a communication module (or communications interface) connectable to the network according to a predetermined communication protocol. A communication module included in each of the devices 1, 2, 3a, 3b, 4, and 7 included in the network system may be selected according to the configuration of the network, and a plurality of communication modules may be provided in one or more of these devices according to various communication methods used between each device and the network or between the devices.

The robot 1 may be connected to the access point 7 via a wired (e.g., Ethernet) or wireless (e.g., Wi-Fi®) communication. Communication between the robot 1 and the accessories 2 and 3b may be achieved via the gateway 4 and/or the access point 7. As another example, communication between the robot 1 and the accessory 3a or between other devices 5 may be achieved via the access point 7. For example, a signal transmitted from the accessories 2 and 3b may be transmitted to the robot 1 via the gateway 4 and the access point 7 in sequence, and a signal transmitted from the robot 1 may be transmitted to the accessories 2 and 3b via the access point 7 and the gateway 4 in sequence. As another example, a signal transmitted from the accessory 3a or other device 5 may be transmitted to the robot 1 via the access point 7, and a signal transmitted from the robot 1 may be transmitted to the accessory 3a or other device 5 via the access point 7.

In one implementation, information acquired by sensor modules of the accessories 2, 3a, and 3b may be transmitted to the server 8, the terminal 6, or the robot 1 via the network. In addition, a signal transmitted from the server 8, the robot 1, or the terminal 6 so as to control the sensor module, a control module, or a remote control module may be transmitted to the accessory 2. The transmission of such signals may be performed via the gateway 4 and/or the access point 7.

In another example, communication between the accessories 2, 3a, and 3b and the robot 1 may be implemented using the gateway 4 and the access point 7. Thus, even when a home network is disconnected from an external communication network such as the Internet, communication between the accessories 2, 3a, and 3b and the robot 1 may continue to be possible within the home network using the gateway 4 and the access point 7.

When the robot 1 is connected to the server (or remote computing device) 8 via the access point 7, information transmitted from the robot 1 or the accessory 2, 3a, 3b may be stored in the server 8. The information stored in the server 8 may be received by the terminal 6 connected to the server 8.

In addition, the information transmitted from the terminal 6 may be transmitted to the robot 1 or the accessory 2, 3a, 3b via the server 8. The terminal 6 may correspond to a smart phone provides a convenient user interface (UI) based on graphics, and it may be possible to control the robot 1 and/or the accessory 2 via the UI or to process and display information received from the robot 1 and/or the accessory 2. In addition, functions that can be implemented through the robot 1 and/or the accessory 2 may be extended by updating applications installed on the smart phone.

In another implementation, the terminal 6 and the robot 1 may communicate with each other without the server 8. For example, the robot 1 and the terminal 6 may directly communicate with each other by using a Bluetooth® scheme, via a local network, via the Internet through a different server, etc.

In one implementation, the robot 1 may control the accessory 2, 3a, 3b or display and process the information received from the accessory 2, 3a, 3b without using the terminal 6. For example, as described below, the robot 1 may include programming and hardware to interact with the accessory 2, 3a, 3b.

In one implementation, the network system may be configured without the gateway 4. For example, the various components may communicate via the access point 7. In another example, the robot 1 may also function as the gateway 4.

As previously described, the accessories 2, 3a, and 3b may include at least one communication module to connect with the network. The communication module may communicate via one or more predetermined network protocols.

The accessories 2, 3a, and 3b may include a sensor module (or sensor) for detecting an attribute of a predetermined surrounding environment. Additionally or alternatively, the accessories 2, 3a, and 3b may include a control module that performs a specific function, such as a function that affects the surrounding environment. Furthermore, the accessories 2, 3a, and 3b may function to control a predetermined peripheral device. For example, the accessories 2, 3a, and 3b may include a remote control module (e.g., a module that includes a transmitter and a controller that manages operation of the transmitter) that transmits an optical signal (for example, an infrared signal) for controlling a predetermined peripheral device.

The accessories 2, 3a, and 3b with the sensor module may include various types of sensors to detect one or more attributes of the surrounding environment. For example, the accessories 2, 3a, and 3b may include one or more of a pressure sensor, a humidity sensor, a temperature sensor, a radiation detection sensor, a heat detection sensor, a gas detection sensor, an air quality sensor, an electronic nose sensor, a healthcare sensor, a biometric sensor, a sleep sensor (for example, the sleep sensor is attached to a user's pajamas or under clothing to detect snoring, apnea, tossing, etc. while the user is sleeping), a proximity sensor, an illuminance sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, and/or a light sensor (for example, a video sensor, an image sensor, etc.).

The accessories 2, 3a, and 3b with the control module include or control a smart lighting to manage outputted illumination, a smart plug for controlling application and degree of power to a connected device, a smart temperature regulator for controlling the operation and intensity of a boiler or an air conditioner, and/or a smart gas lock for controlling shutoff of gas.

The accessories 2, 3a, and 3b with the remote control module may include transmitter having an infrared (IR) light emitting diode (LED) or the like for emitting an IR signal to a remote controllable household appliance (such as a television, audio device, or the like). The IR signal may include instructions to activate or modify operation of the household appliance.

The accessories (for example, 3a and 3b) may perform predetermined different types of functions. For example, the accessory 3a may be a video camera, and the accessory 3b may be a smart plug.

The accessory 2 according to the embodiment may be provided so as to be installed at any position desired by the user. In addition, the accessory 2 may be provided so as to be utilized for various purposes. For example, the accessory 2 may be attached to an external object such as a household appliance, a door, a window, or a wall.

The gateway 4 may mediate communication between one or more accessories 2 and 3b and the access point 7. The gateway 4 may communicate with the accessory 2 by wire or wirelessly. The gateway 4 may communicate with the access point 7 by wire or wireless. For example, the communication between the gateway 4 and the access point 7 may be based on Ethernet, Wi-Fi®, or other wireless communication protocol.

The access point 7 may be connected to the server 8 via wired or wireless communication. The server 8 maybe connected via the Internet. The access point 7 may communicate with the server 8 through various terminals 6 connected to the Internet. The terminal 6 may be a mobile terminal such as a personal computer (PC) or a smart phone.

The accessories 2 and 3b may be provided so as to communicate with the gateway 4. In another example, the accessory 3a may be provided so as to directly communicate with the access point 7 without passing through the gateway 4.

The access point 7 may directly communicate with the accessory 3a or other device 5 equipped with a communication module without using signals passing through the gateway 4. In one implementation, these devices 5 and 3a may include a Wi-Fi® communication module so as to directly communicate with the access point 7 without using signals passing through the gateway 4.

As shown in FIGS. 2-7, the robot 1 according to one embodiment may include a base 100, a spin body 200 (also referred to as a first housing or lower housing) rotatably disposed on the base 100, a tilting body (also referred to as a second housing or upper housing) 300 supported on the spin body 200 so as to be tiltable along a tilting shaft (or tilting axis) OT, and at least one interface device 42, 44, 54, and 56, such as a device to receive, collect, transmit, or output content, provided in at least one of the spin body 200 or the tilting body 300.

The base 100 may be positioned at a lowermost end of the robot 1. For example, the base 100 may contact a floor surface to support the robot 1. Although shown as being level to be fixed to a certain location, it should be appreciated that one or more wheels may be coupled to the base 100 so that the robot 1 may move.

The spin body 200 may be rotatably coupled to the base 100. For example, the spin body 200 may rotate about a rotational shaft (or rotational axis) OS extending in a vertical direction with respect to the base 100. The rotational shaft OS may correspond to an axis of rotation for the spin body 200 relative to the base 100.

The spin body 200 may be configured to rotate up to a predetermined angle. For example, the spin body 200 may be configured to rotate by 360 degrees or less. The spin body 200 may rotate about the rotational shaft OS in a clockwise and/or a counterclockwise.

The tilting body 300 may be supported on the spin body 200 so as to be tiltable at the tilting axis OT. The tilting axis OT may extend in a horizontal direction (e.g., in a left-to-right direction) relative to a "front" (e.g., a position associated with the user interface module 400) of the robot 1.

In certain configurations, the tilting shaft OT may be rotated together with the spin body 200 during the rotation of the spin body 200 about the rotational shaft OS. For example, the tilting body 300 may be rotated together with the spin body 200 during the rotation of the spin body 200, and may be tiltably connected to the spin body 200 at the tilting shaft OT. Accordingly, since the tilting body 300 may be rotatable and tiltable relative to the base 100 and the floor, the tilting body 300 may be considered to have two degrees-of-freedom (DOF).

Figure 3:
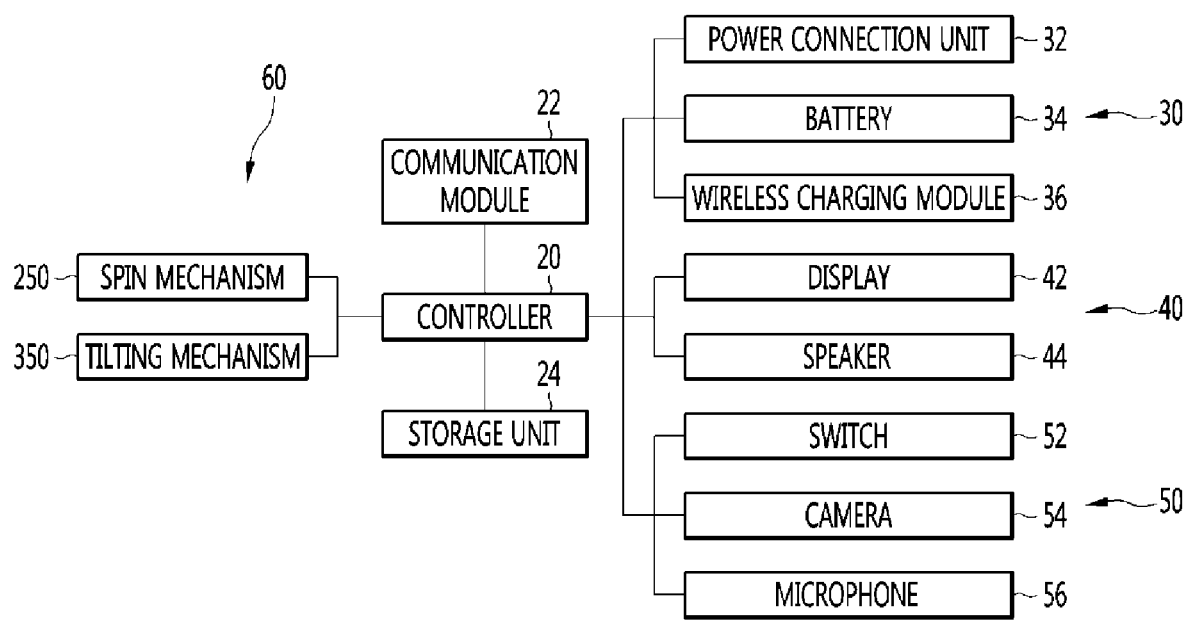
FIG. 3 is a control block diagram of the robot according to the embodiment.

Referring to FIG. 3, the robot 1 may include a controller 20 to manage operation of the robot 1. In another example, the controller 20 may be provided externally of the robot 1, such as in the server 8 or the terminal 6, so as to control the robot 1 through the network or may be provided in another device, such as terminal 6, that is directly connected to the robot 1.

The robot 1 may include a communication module (or communication interface) 22 to communication with another device or with a network. The communication module 22 may include, for example, one or more of a local wireless networking (e.g., Wi-Fi®) module, a local wireless connection (e.g., Bluetooth®) module, a wireless mesh networking (e.g., Zigbee) module, and/or a wireless communication (e.g., Z-Wave®) module. The specific component and configuration of the communication module 22 may vary according to a communication scheme of a device to which the robot 1 is directly communicating. For example, the communication module 22 may include a transceiver that exchanges signals to communicate with at least one of the access point 7, the gateway 4, the accessories 2, 3a, and 3b, the server 8, or the terminal 6 constituting the network system.

Information acquired from the input unit 50 may be transmitted over the network through the communication module 22. Information may be received by the robot 1 via the network through the communication module 22, and the controller 20 may control an output unit 40 (e.g., to output information to a user) or control a driving unit 60 (e.g., to move a component of the robot 1) based on the received information.

The robot 1 may include a storage unit (or memory) 24 for storing information. The storage unit 24 may store information received from the network through the communication module 22. The storage unit 24 may store commands from the input unit 50. Information relating to the overall operation of the robot 1 may be stored in the storage unit 24.

The robot 1 includes a power supply device (or a power supply or power supply circuitry) 30 for supplying power to the respective components of the robot 1. The power supply device 30 may include a power connection unit (or power connection port or socket) 32 capable of being connected to an external wired power cable. The power connection unit 32 may be implemented by a socket to receive the power cable. The power supply device 30 may include a battery 34 that store power. The power supply device 30 may include circuitry to charge the battery 34 based on externally received power (e.g., via the power connection unit 32). In one implementation, the power supply device 30 may further include a wireless charging module 36 capable of wirelessly charging the battery 34 (e.g., via a Qi® or other type of charging pad that provides an inductive charging field).

The robot 1 may include the output unit (also referred to as an output device or user interface) 40. The output unit 40 may output the information visually or audibly to the outside. The output unit 40 includes a display 42 for outputting information visually. The output unit 40 may include a speaker 44 for outputting information audibly.

The robot 1 may include the input unit (or input device or user interface) 50. The input unit 50 may receive an input from a user, such as data identifying a command for controlling the robot 1. The input unit 50 may be configured to allow a user to directly input a command without passing through the communication module 22 (e.g., without the command being provided via an interface provided by the terminal 6 or other device). Additionally or alternatively, the input unit 50 may receive a command for controlling another device through the robot 1, such as the accessory 2. In one example, the output unit 40 and the input unit 50 may include a shared component that both outputs and receives data, such as a touch-type (or touch-screen) display.

The input unit 50 may include a switch 52. In one implementation, the switch 52 may include a power switch for turning on/off the robot 1. For example, the switch may cause power to the robot to be provided or turned off. The switch 52 may include a function switch for setting a function of the robot 1, pairing with a predetermined network, pairing with the terminal 6, and the like. It is possible to set various commands to the robot 1 through a combination of the pressing time of the function switch and/or the number of times of continuously pressing the function switch. The switch 52 may include a reset switch capable of resetting a predetermined setting of the robot 1. In another example, the switch 52 may include a sleep switch for switching the robot 1 to a power-saving state or a non-output state.

The input unit 50 may include a sensor, such as a camera 54 for sensing an external visual image. In one implementation, the camera 54 may acquire an image for recognizing the user or an attribute of a region where the robot 1 is located. In one implementation, the robot 1 may process an image captured by the camera 54 to identify a representation of a user, and may recognize a direction of the user based on a geographic location or view associated with captured image and a position of the user in the image. Image information acquired by the camera 54 may be stored in the storage unit 24.

The input unit 50 includes a microphone 56 for sensing an external sound. When the robot 1 includes the microphone 56, the controller 20 of the robot 1 may recognize the user's voice input through the microphone 56 and extract a command. In order to recognize a position of a sound source, the input unit 50 may include a plurality of microphones 56, and the robot 1 may identify a position a sound source based respective attributes identify in the different audio captured by the microphones, such different detected volumes of a user's voice detected by the microphones. The sound information acquired by the microphone 56 and/or the position information about the user may be stored in the storage unit 24.

The robot 1 may include a direction sensor (not illustrated) for sensing the direction of the user with respect to the robot 1. The direction sensor may include the camera 54 and/or the plurality of microphones 56.

The robot 1 includes a driving unit (or motor) 60 for performing motion of the robot 1, such as to move one or more sections of the robot 1. The robot 1 may simulate a living person or creature by performing a motion of the robot 1 together with outputting visual contents by the display 42 of the robot 1 and/or outputting audio contents by the speaker 44 of the robot 1. Similar to how a gesture (motion) or eye contact plays a big role in human-human communication, the motion of the robot 1 by the driving unit 60 may function to help a user to efficiently recognize and understand the output contents of the output unit 40, such as to provide a context for the output contents. For example, the motion of the robot 1 by the driving unit 60 may add emotional elements in the communication process between the user and the robot 1.

The driving unit 60 may include a plurality of driving units (or driving mechanisms or motors) 250 and 350. The plurality of driving units 250 and 350 may be independently driven, or may be simultaneously driven to enable complex motion.

The driving unit 60 may include a spin mechanism 250 for rotating the spin body 200 with respect to the base 100. The spin mechanism 250 may provide power so as to rotate the spin body 200 about the rotational shaft OS extending in the vertical direction with respect to the base 100. The rotational shaft OS may mean a virtual rotational axis.

The driving unit 60 may further include a tilting mechanism 350 for tilting the tilting body 300 about the tilting shaft OT. The tilting mechanism 350 may provide power to the spin body 200 such that the tilting body 300 is tilted to one side (e.g., away from an axis associated with the rotational shaft OS or other vertical direction).

The tilting mechanism 350 may provide a force so as to rotate the tilting body 300 about the tilting shaft OT. In one configuration, the tilting mechanism 350 may be connected to the spin body 200, and when the spin body 200 is rotated by the spin mechanism 250, the tilting mechanism 350 and the tilting body 300 may be rotated together with the spin body 200. In another configuration, the spin body 200 may be connected to the tilting mechanism 350, and when the tilting body 300 is titled by the tilting mechanism 350, the spin body 200 and the spin mechanism 250 may be rotated together with the tilting body 300.

The controller 20 may control the communication module 22 based on control information received from the input unit 50. The controller 20 may perform control such that the communication module 22 stores the information received from the network in the storage unit 24. The controller 20 may perform control such that the information stored in the storage unit 24 is transmitted to the network via the communication module 22.

The controller 20 may receive control information from the input unit 50. The controller 20 may perform control such that the output unit 40 outputs predetermined information. The controller 20 may perform control such that the driving unit 60 operates together with the information output of the output unit 40.

For example, the controller 20 may recognize the user based on the image acquired by the camera 54, and may operate the output unit 40 and the driving unit 60 based on the recognition result. When the recognized user matches a preset user, the controller 20 may display a smile image on the display 42 and operate the tilting mechanism 350 to tilt the tilting body 300 in the vertical or horizontal direction.

As another example, the controller 20 may recognize the face position of the user based on the direction sensor, and may operate the output unit 40 and the driving unit 60 based on the recognition result. The controller 20 may display predetermined information on the display 42 and operate the spin mechanism 250 such that the display 42 is moved toward the user's face. The controller 20 may perform control such that the spin body 200 is rotated so as to switch the image output direction of the display 42 to the direction of the user detected by the direction sensor.

The controller 20 may control whether to operate the driving unit 60 based on the control information received from the network via the communication module 22. The controller 20 may control the driving unit 60 based on the control information received from the input unit 50. The controller 20 may control the driving unit 60 based on the control information stored in the storage unit 24.

The robot 1 may include a remote control module. The remote control module may transmit an optical signal (for example, an infrared signal) or an radio signal for controlling a predetermined peripheral device. The predetermined peripheral device may mean a device capable of being remotely controlled. For example, the predetermined peripheral device may be a washing machine, a refrigerator, an air conditioner, a robot cleaner, a TV, and the like, which can be controlled by a remote controller. When the peripheral device is controlled via an optical signal, the remote control module may include a light emitting unit (not illustrated) for emitting a predetermined optical signal for controlling the predetermined peripheral device. For example, the light emitting unit may be an LED that emits infrared rays. The direction in which the remote control module irradiates the optical signal may be changed according to the operation of the robot 1. For example, the remote control module may be located at a portion of the robot 1 that is spun by spin mechanism 250 and/or tilted by the tilting mechanism 350 to be positioned in a direction associated with the predetermined peripheral device. In this manner, the optical signal irradiation direction of the remote control module may be changed in the direction of the specific device requiring the remote control, so as to control the specific device by the optical signal.

The display 42, the speaker 44, the camera 54, and the microphone 56, included in the robot 1 may function as interfaces for helping communication between the human and the robot 1. These interfaces may be mounted on the spin body 200 and may be rotatable together with the spin body 200 during the rotation of the spin body 200, and these interfaces may be mounted on the tilting body 300 and may be tilted together with the tilting body 300 during the tilting of the tilting body 300. For example, in the robot 1, the interfaces such as the display 42, the speaker 44, the camera 54, and the microphone 56 may be distributed in the spin body 200 and the tilting body 300.

The robot 1 may include interface modules 400 and 410 including at least one of the interfaces such as the display 42, the speaker 44, the camera 54, and the microphone 56. The interface modules 400 and 410 may be mounted on the tilting body 300, may be rotated together with the tilting body 300 during the rotation of the spin body 200, and may be tilted together with the tilting body 300 during the tilting of the tilting body 300. In one configuration, various components of the battery 34, the display 42, the speaker 44, the camera 54, the microphone 56, the spin mechanism 250, the tilting mechanism 350, and the like are preferably supported to the spin body 200 or the tilting body 300 in consideration of the weights or sizes thereof, and may be preferably arranged to position a center of gravity of the robot 1 at a desired location to improve stability and movement.

Figure 8:
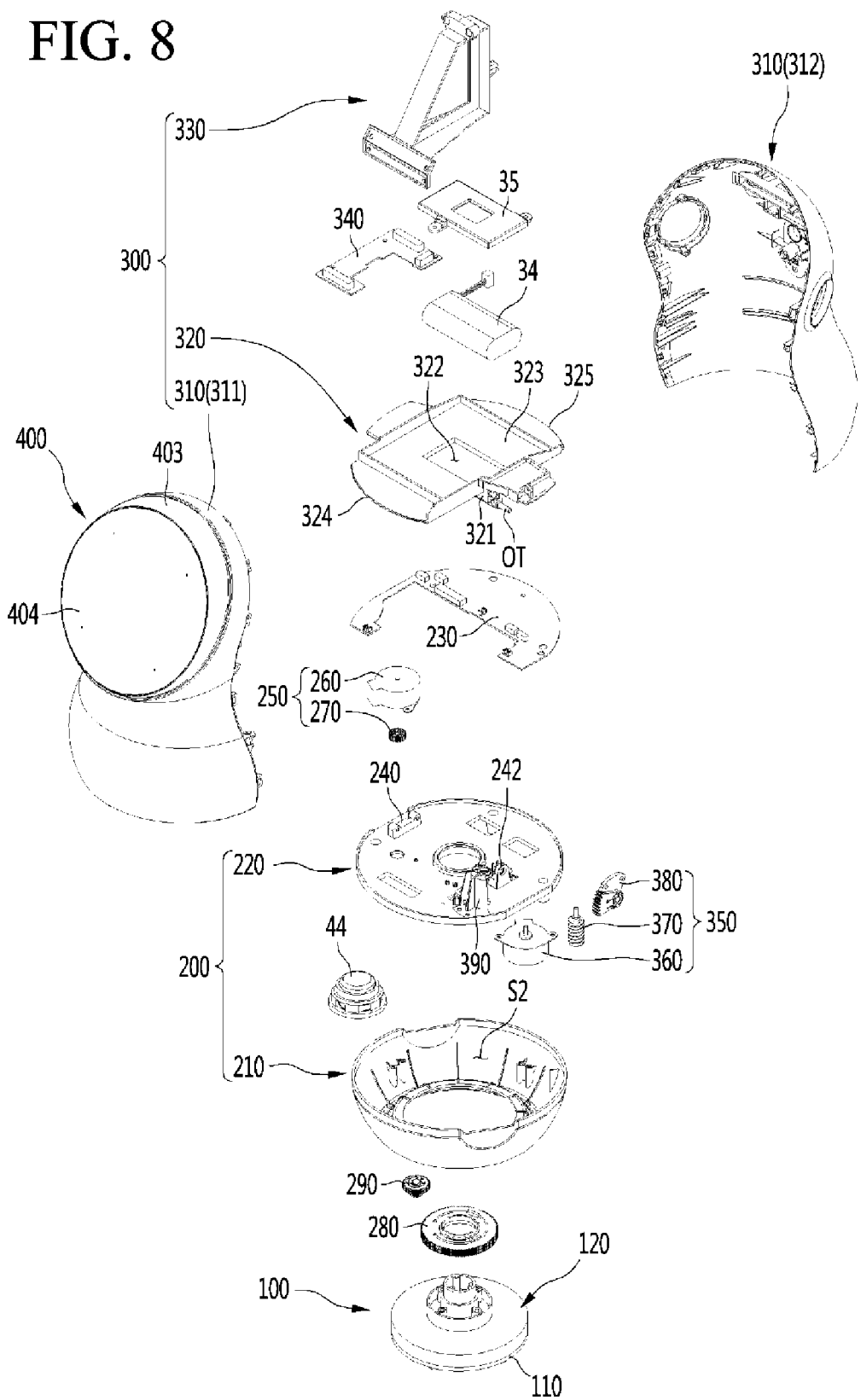
FIG. 8 is an exploded perspective view of the robot according to the embodiment.

FIG. 8 is an exploded perspective view of the robot 1 according to one embodiment. As previously described, the base 100 may rotatably support the spin body 200 and may support the loads of the spin body 200, the tilting body 300, and the interface modules 400 and 410.

The base 100 may include a combination of a plurality of members. For example, the base 100 may include a base body 110 for supporting the entire load of the robot 1, and a spin body connecting portion 120 disposed on the upper side of the base body 110 and rotatably connected to the spin body 200.

The shape of the base body 110 may have, for example, a disk-like shape to be positioned on a level receiving surface, but is not limited thereto. In order to stably support the robot 1, the horizontal size of the base body 110 may be equal to or greater than the size of the spin body connecting portion 120. A more detailed description of the configuration of the base 100 will be provided later in detail.

The spin body 200 may include a spin housing 210 having a space S2 formed therein, and a spin cover 220 covering the space S2 from above. At least one of the spin housing 210 or the spin cover 220 may be rotatably connected to the base 100.

One or more components, such as a component of the interface 50, may be accommodated in the space S2 inside the spin body 200. For example, the speaker 44 may be accommodated in the space S2 inside the spin body 200. In this implementation, the speaker 44 may be accommodated in the space S2 inside the spin body 200 because the speaker 44 is generally heavy in weight as compared with other components, and positioning the speaker 44 in the space S2 may lower a center of gravity for the robot 1 to help improve stability. However, embodiments of the robot 1 are not limited thereto, and other components such as the microphone 56, the battery 34, and the driving printed circuit board (PCB) 230 may be accommodated in the space S2 inside the spin body 200. In another example, the speaker 44 may be positioned away from the space S2, such as being mounted on the tilting body 300.

In addition, a tilting motor 360 that provides a force to tilt a portion of the robot 1, which will be described later, may be accommodated in the space S2 inside the spin body 200. In this configuration, the spin housing 210 and the spin cover 220 may function as a protective cover for protecting one or more components (e.g., the speaker 44) and the tilting motor 360 accommodated in the space S2.

A section of the spin housing 210 may be exposed to the outside. For example, a lower external region of the spin housing 210 may be seen through the lower end of the tilting housing 310 to be described later, and this portion of the spin housing 210 may constitute part of the appearance of the communication robot.

The spin housing 210 may have a shape in which the top surface thereof is opened and the size (e.g., horizontal cross-sectional area) thereof is reduced downward. In this example, the outer surface of the spin housing 210 may be convex toward the outside. The diameter of the upper end of the spin housing 210 may be larger than the diameter of the lower end of the spin housing 210. For example, the spin housing 210 may have a semi-spherical shape with an open top.

The spin cover 220 may have a substantially planar or plate shape and may be sized and shaped to be mounted on the upper end of the spin housing 210. For example, the spin cover 220 may be inserted into the spin housing 210 and coupled to top inside, edge surface of the spin housing 210. The spin cover 220 may cover the opened upper surface of the spin housing 210. The shape of the spin cover 220 may be formed to correspond to the shape of the upper end of the spin housing 210. For example, the spin cover 220 may have a substantially circular shape to corresponds to a circular upper opening of the spin housing 210.

Tilting shaft supporters (or tilting shaft supporting projections) 240 and 242 for rotatably supporting the tilting shaft OT connected to the tilting body 300 may be disposed on the spin cover 220. The tilting shaft supporters 240 and 242 may be disposed on the top surface of the spin cover 220. The pair of tilting shaft supporters 240 and 242 may be arranged so as to be spaced apart in the horizontal direction, and the tilting shaft OT may be rotatably received by the tilting shaft supporters 240 and 242. For example, one or more of the tilting shaft supporters 240 and 242 may include an opening or slot to receive a portion of the tilting shaft OT.

The robot 1 may further include a driving PCB 230 disposed on a portion of the spin body 200, such as the spin cover 220. For example, the driving PCB 230 may be seated on the top surface of the spin cover 220. For example, the driving PCB 230 may be horizontally disposed on the top surface of the spin cover 220.

The driving PCB 230 may be smaller than the spin cover 220 and may be disposed to cover a part of the top surface of the spin cover 220. In one example, the area of the driving PCB 230 may be less than half the upper area of the spin cover 220.

The driving PCB 230 may control at least one electrical component mounted on or positioned near the spin cover 220. For example, the driving PCB 230 may be electrically connected to the spin motor 260 and the tilting motor 360 disposed in the spin body 200 and may control the spin motor 260 and the tilting motor 360. For example, the driving PCB 230 may regulate the power provided to the spin motor 260 and the tilting motor 360 to modify the respective forces generated by the spin motor 260 and the tilting motor 360.

Since the spin motor 260, the tilting motor 360, and the driving PCB 230 are all mounted on the spin body 200, they may revolve around the rotational shaft OS of the spin body 200 during the rotation of the spin body 200. Therefore, no relative motion may occur between the spin motor 260, the tilting motor 360, and the driving PCB 230, and no tangling or twisting may occur in various wires or other connecting members for connecting the driving PCB 230 and the motors 260 and 360.

The spin mechanism 250 may rotate the spin body 200 with respect to the base 100. In one example, the spin mechanism 250 may include a spin motor 260, a spin driving gear 270, and a spin driven gear 280. Optionally, the spin mechanism 250 may further include a spin intermediate gear 290.

The spin motor 260 may provide power so as to rotate the spin body 200 with respect to the base 100. The spin motor 260 may be disposed in the spin cover 220. For example, the spin motor 260 may be disposed on the top surface of the spin cover 220. The driving shaft of the spin motor 260 may be vertically disposed below the spin motor 260. The driving shaft of the spin motor 260 may protrude toward the space S2 inside the spin body 200.

The spin motor 260 may be disposed between the spin cover 220 and a tilting base (or plate) 320 to be described later. For example, the spin motor 260 may be disposed between the top surface of the spin cover 220 and the bottom surface of the tilting base 320. The spin motor 260 may be protected by the spin cover 220 and the tilting base 320.

The spin driving gear 270 may be connected to the driving shaft of the spin motor 260 in the space S2 inside the spin body 200. The spin driving gear 270 may be rotated by the spin motor 260 inside the spin body 200 and may be protected by the spin body 200. The spin driving gear 270 may be suspended from the driving shaft of the spin motor 260. For example, the spin driving gear 270 may be rotated by the spin motor 260 below the bottom surface of the spin cover 220.

The spin driven gear 280 may be fixed to the base 100. The spin driven gear 280 may be a fixed gear that is fixedly mounted to the spin body connecting portion 120 of the base 100. In one example of the spin mechanism 250, the spin driving gear 270 may be engaged with the spin driven gear 280. In this case, the spin driving gear 270 may be rotated while revolving around the outer circumference of the spin driven gear 280.

In the spin mechanism 250, the spin driving gear 270 may not directly engage the spin driven gear 280, and the spin driving gear 270 and the spin driven gear 280 may be connected via at least one spin intermediate gear 290. For example, the spin intermediate gear 290 may be rotatably connected to the spin cover 220. The spin intermediate gear 290 may be disposed below the bottom surface of the spin cover 220. For example, the spin intermediate gear 290 may be accommodated in the space S2 of the spin body 200, like the spin driving gear 270.

The spin intermediate gear 290 may transmit power between the spin driving gear 270 and the spin driven gear 280. The spin intermediate gear 290 may rotate while revolving around the outer circumference of the spin driven gear 280.

The tilting body 300 may include a tilting housing (or upper housing) 310, a tilting base 320, and a tilting supporter (or support frame) 330. The tilting housing 310 may form a portion of the appearance of the robot 1 and may be formed to be larger than the spin housing 210. For example, the tilting housing 310 may be provided over a portion of the spin housing 210. Therefore, the tilting housing 310 may be referred to as an outer case or outer housing.

The bottom surface of the tilting housing 310 may be opened, and an upper space S3 (see FIG. 17) may be formed therein (e.g., above the spin cover 220). The tilting base 320 and the tilting supporter 330 may be accommodated in the upper space S3 of the tilting housing 310.

The tilting housing 310 may cover at least part of the outer circumference of the spin body 200. For example, the spin cover 220 may be disposed inside the tilting housing 310, and the lower inner surface of the tilting housing 310 may face the outer circumferential surface of the spin housing 210.

In one implementation, the tilting housing 310 may include a combination of housing members, and the housing members may be disposed on front and rear and/or left and right and may be coupled to each other. For example, the tilting housing 310 may include a first tilting housing (or first upper housing) 311 and a second tilting housing (or second upper housing) 312 coupled to the first tilting housing 311, and the upper space S3 may be formed between the first tilting housing 311 and the second tilting housing 312. The first tilting housing 311 and the second tilting housing 312 may be coupled to the tilting base 320.

When the first tilting housing 311 is a front tilting housing, the second tilting housing 312 may be a rear tilting housing coupled to the rear end of the first tilting housing 311. When the first tilting housing 311 is a left tilting housing, the second tilting housing 312 may be a right tilting housing coupled to the right end of the first tilting housing 311.

The interface module 400 may be disposed in the tilting housing 310. For example, the interface module 400 may be mounted on a portion of the first tilting housing 311. The interface module 400 may be disposed above the tilting base 320.

The tilting base 320 may be protected by the tilting housing 310 while being accommodated in the upper space S3 of the tilting housing 310. The tilting base 320 may be connected to the tilting shaft OT and rotated together with the tilting shaft OT. A tilting shaft connecting portion (or tilting shaft connecting protrusion) 321, to which the tilting shaft OT is connected, may be formed in the tilting base 320. For example, the tilting shaft connecting portion 321 may be formed to extend from the lower portion of the tilting base 320. The tilting shaft OT may extend in a horizontal direction and may be connected to the tilting shaft connecting portion 321.

The tilting shaft OT may be connected to the tilting base 320, and the tilting base 320 may be connected to the tilting housing 310. When the tilting shaft OT is rotated, the tilting base 320 and the tilting housing 310 may be tilted while rotating together around the tilting shaft OT.

The tilting base 320 may include connecting portions (or connecting regions) 324 and 325 that are connected to an inside region of the tilting base 320. More specifically, a first connecting portion 324 configured to be connected to the inside of the first tilting housing 311 may be formed at one side of the tilting base 320, and a second connecting portion 325 configured to be connected to the inside of the second tilting housing 312 may be formed on the other side of the tilting base 320.

The robot 1 may further include an intermediate PCB 340 disposed in the tilting base 320. The intermediate PCB 340 may be seated on the top surface of the tilting base 320. In one implementation, the intermediate PCB 340 may be horizontally disposed on the top surface of the tilting base 320. For example, a PCB mounting portion (or PCB mounting surface region) 323 on which the intermediate PCB 340 is mounted may be formed in the tilting base 320. The PCB mounting portion 323 may be formed on the top surface of the tilting base 320.

The intermediate PCB 340 may be smaller than the tilting base 320, and may be disposed to cover part of the top surface of the tilting base 320. In one example, the surface area of the intermediate PCB 340 may be less than half the upper surface area of the tilting base 320.

The battery 34 may be mounted on the tilting base 320. For example, a battery mounting portion (or battery mounting surface region) 322 on which the battery 34 is mounted may be formed in the tilting base 320. The battery mounting portion 322 may be formed on the top surface of the tilting base 320. The battery mounting portion 322 may be a pocket into which the battery 34 can be inserted and accommodated. In addition, a battery cover 35 may be coupled to the tilting base 320 so as to prevent the battery 34 accommodated in the battery mounting portion 322 from being removed without removing the battery cover 35.

The tilting supporter 330 may reinforce the strength of the tilting housing 310. For example, tilting supporter 330 may reinforce the strength of the tilting housing 310 by connecting together weak portions of the tilting housing 310. The tilting supporter 330 may be accommodated in the tilting housing 310 and may be positioned above the tilting base 320 (e.g., above the battery 34 and opposite to the spin cover 220). In one example, portions of the tilting supporter 330 may be spaced apart from the tilting base 320 in a vertical direction.

The tilting supporter 330 may extend through the space S3 to connect the inner side of the first tilting housing 311 and the inner side of the second tilting housing 312. When the first tilting housing 311 is the front tilting housing and the second tilting housing 312 is the rear tilting housing, the tilting supporter 330 may extend in the front-rear direction and may be disposed in the central portion of the tilting housing 310 in the horizontal direction.

The tilting supporter 330 may reinforce the tilting housing 310 so as to prevent damage due to an external impact. For example, the tilting supporter 330 may be connected to the inside of the first tilting housing 311 and the second tilting housing 312 so as to reinforce the connection between the first tilting housing 311 and the second tilting housing 312. The tilting supporter 330 may be disposed in the upper space S3 of the tilting housing 310 and may function as a frame for internally supporting the tilting housing 310. Additional aspect of the tilting supporter 330 will be described later in detail.

The tilting mechanism 350 may include a tilting motor 360 to provide a driving force, a tilting driving gear 370 having a lower side connected to the tilting motor 360 to receive the driving force generated by the tilting motor 350, and a tilting driven gear 380 connected to at least one of the tilting shaft OT or the tilting body 300 and receiving the driving force from of the tilting driving gear 370.

The tilting motor 360 may provide power for tilting the tilting body 300 about the tilting shaft OT. In one example, the tilting motor 360 may be disposed below the spin cover 220, and the tilting driven gear 380 may be disposed above the spin cover 220. The power of the tilting motor 360 may be transmitted to the tilting driven gear 380 through the tilting driving gear 370.

The tilting driving gear 370 may be connected to the tilting motor 360 and be rotated based on the force generated by the tilting motor 360. In one example, the tilting driving gear 370 may be a worm gear disposed vertically. The tilting driving gear 370 may be vertically disposed on the upper side of the spin cover 220 when be connected to the tilting motor 360.

A lower rotational shaft including the lower end of the tilting driving gear 370 may be connected to the tilting motor 360, and an upper rotational shaft including the upper end of the tilting driving gear 370 may be rotatably supported by a gear supporter (or gear supporting post) 390 to be described later.

The tilting driven gear 380 may be disposed above the spin cover 220 and may be connected to at least one of the tilting shaft OT or the tilting body 300. The tilting driven gear 380 may be a spur gear that rotates about the tilting shaft OT. The tilting driven gear 380 may be connected to at least one of the tilting shaft OT or the tilting base 320 so as to tilt the tilting body 300.

As previously described, the robot 1 may further include a gear supporter 390 to which the tilting driving gear 370 is rotatably connected. The gear supporter 390 may extend from or be mounted on the spin cover 220 and may rotatably support the tilting driving gear 370. For example, the gear supporter 390 may be positioned at an upper surface of the spin cover 220. The gear supporter 390 may be connected to the upper portion of the tilting driving gear 370.

Figure 9:
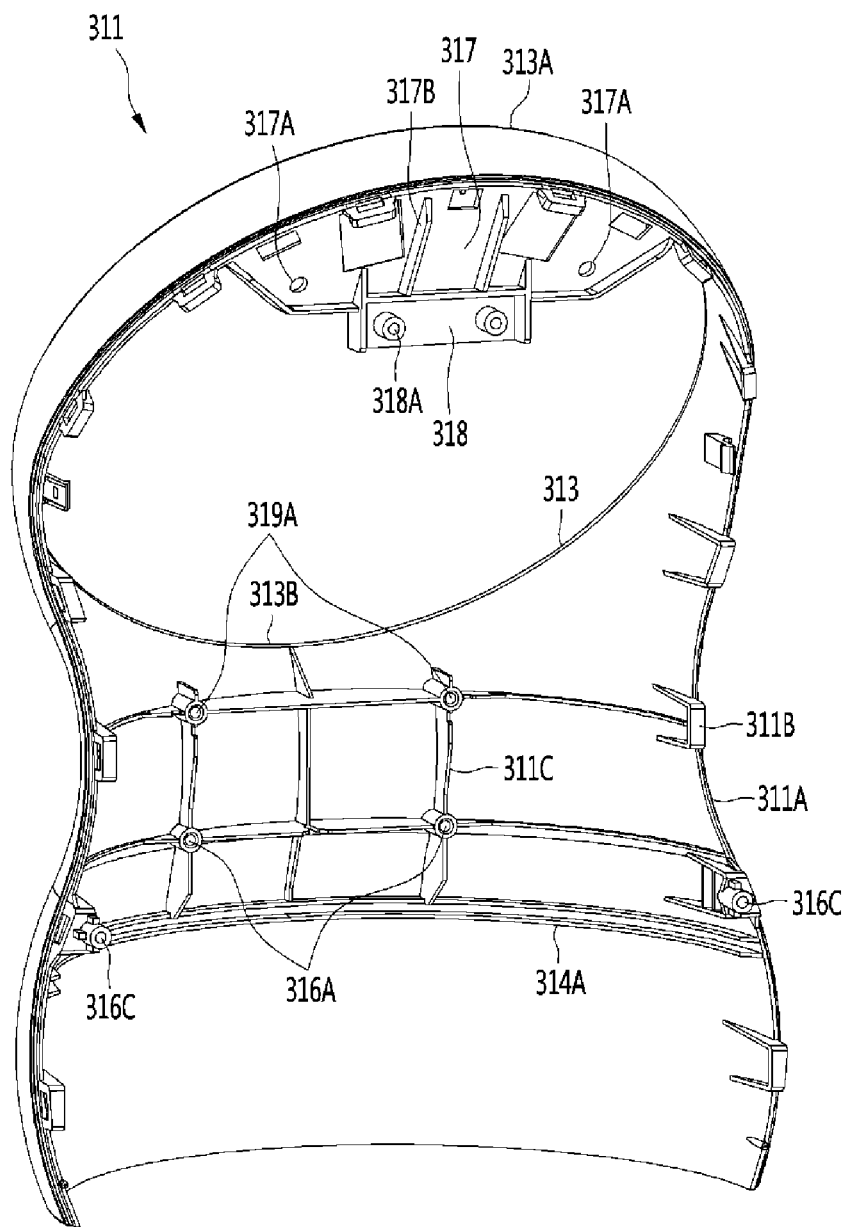
FIG. 9 is a perspective view of a first tilting housing according to an embodiment.
Figure 10:
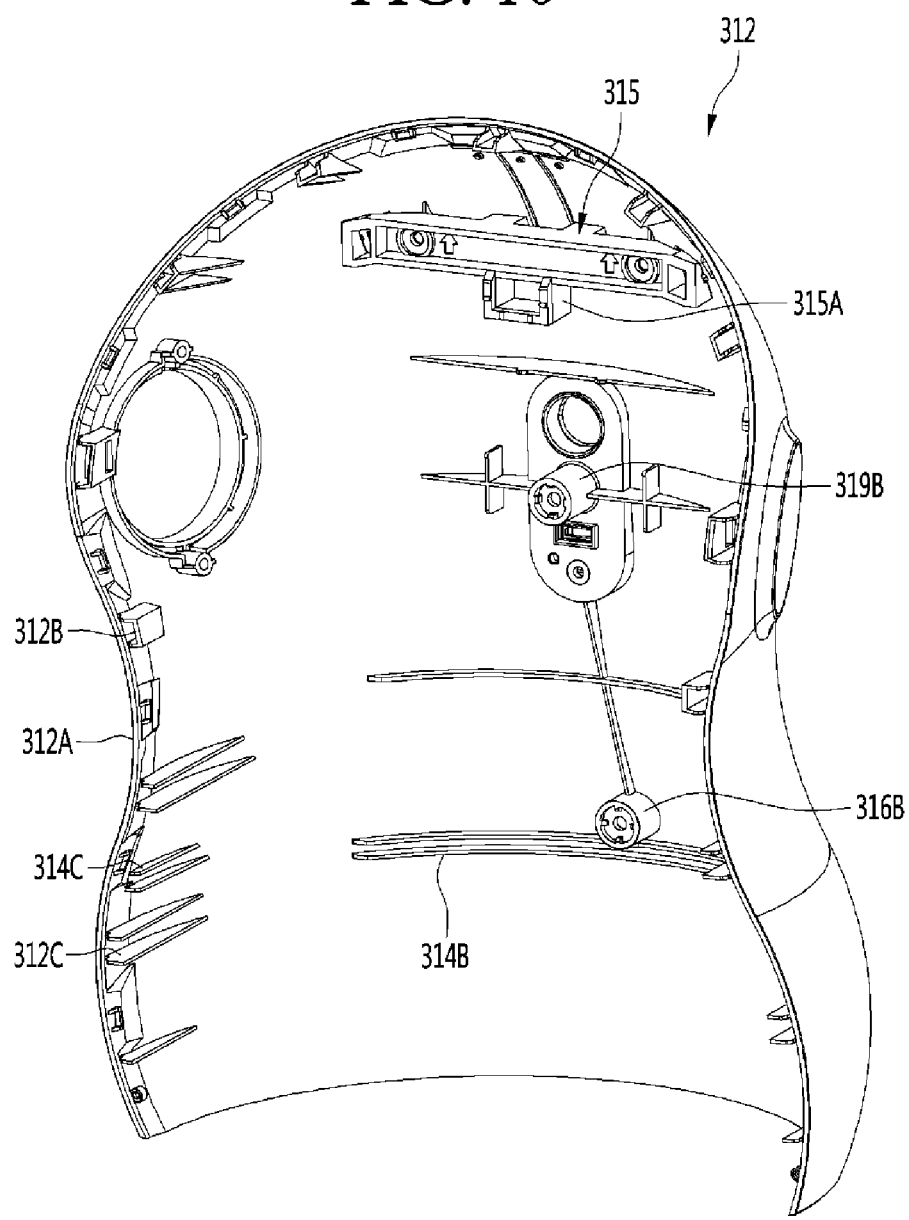
FIG. 10 is a perspective view of a second tilting housing according to an embodiment.

FIG. 9 is a perspective view of the first tilting housing according to an embodiment, and FIG. 10 is a perspective view of the second tilting housing according to an embodiment. As described above, the tilting housing 310 may include the first tilting housing 311 and the second tilting housing 312. The shape of each of the first tilting housing 311 and the second tilting housing 312 may include a free curved surface. For example, the outer surface of the first tilting housing 311 and the outer surface of the second tilting housing 312 may be convex toward the outside, and the inner surfaces thereof may be concave. However, embodiments are not limited thereto, and the first tilting housing 311 and the second tilting housing 312 may include various flat surfaces, curved surfaces, or other shapes.

The first tilting housing 311 and the second tilting housing 312 may be fastened to each other. When the first tilting housing 311 and the second tilting housing 312 are fastened together, an edge 311A of the first tilting housing 311 and an edge 312A of the second tilting housing 312 may be in contact with each other. The edges 311A and 312A may correspond to a boundary line at which the inner surface and the outer surface of the tilting housings 311 and 312 meet each other.

When the first tilting housing 311 is the front tilting housing and the second tilting housing 312 is the rear tilting housing, the edge 311A of the first tilting housing 311 may be directed rearward and the edge 312A of the second tilting housing 312 may be directed forward. Therefore, the outer surfaces of the first tilting housing 311 and the second tilting housing 312 may be continuously connected without a break or a step. Therefore, the design aesthetic impression of the tilting housing 310 may be improved.

The first tilting housing 311 may be provided with a first housing fastening portion (or fastening tab) 311B, and the second tilting housing 312 may be provided with a second housing fastening portion (or fastening recess) 312B to be fastened to the first housing fastening portion 311B. One of the first housing fastening portion 311B and the second housing fastening portion 312B may have a hook shape (e.g., a fastening hook), and the other thereof may have an annular shape by which the hook is caught (e.g., a fastening post). However, embodiments are not limited thereto.

A plurality of first housing fastening portions 311B spaced apart from each other along the edge 311A of the first tilting housing 311 may be formed. A plurality of second housing fastening portions 312B spaced apart from each other along the edge 311A of the second tilting housing 312 may be formed. The number of the first housing fastening portions 311B may be the same as the number of the second housing fastening portions 312B. In one example, one of the first housing fastening portion 311B or the second housing fastening portion 312B may have a hook shape, and the other thereof may have an annular shape by which the hook is caught. In another example, some of the first housing fastening portion 311B and the second housing fastening portion 312B may have a hook shape, while corresponding other ones of the first housing fastening portion 311B and the second housing fastening portion 312B may have an annular shape by which the hook is caught At least one reinforcing rib 311C and 312C may be formed on the inner surfaces of the first tilting housing 311 and/or the second tilting housing 312. For example, the reinforcing ribs 311C and 312C may be formed at a portion of the first tilting housing 311 and/or the second tilting housing 312 where stress is concentrated. For example, the reinforcing rib 311C formed in the first tilting housing 311 may be formed at a portion adjacent to a second supporter fastening portion 319A and a first tilting base fastening portion 316A, which will be described later. In addition, the reinforcing rib 312C formed in the second tilting housing 312 may be formed at a portion adjacent to the second housing fastening portion 312B. However, the positions of the reinforcing ribs 311C and 312C are not limited thereto.

The first tilting housing 311 may include an opening 313 through which the interface module 400 (see FIG. 8) may be mounted. The opening 313 may be formed on the upper portion of the first tilting housing 311. The shape of the opening 313 may corresponds to a shape of exterior side edges of the interface module 400. For example, the opening 313 may be substantially circular to receive a circular-shaped interface module 400. The opening 313 may be positioned to penetrate through the front side of the first tilting housing 311. In this example, the front side may include both a front upper side (e.g., extending above the opening 313) and a front lower side (e.g., extending below the opening 313).

The upper portion 313A of the opening 313 may correspond to the highest position and a portion adjacent to the highest position with reference to the lower end of the first tilting housing 311 in the inner circumference of the opening 313. On the contrary, the lower portion 313b of the opening 313 may mean the lowest position and a portion adjacent to the lowest position with reference to the lower end of the first tilting housing 311 in the inner circumference of the opening 313.

An interface module fastening body (or interface module fastening shelf) 317 may be formed in the opening 313. The interface module fastening body 317 may be fastened to a rear of the interface module 400 when the interface module 400 is mounted on the opening 313. At least one fastening hole 317A may be formed in the interface module fastening body 317, and a fastening member such as a screw may pass through the fastening hole 317A and fasten the interface module 400 to the interface module fastening body 317.

The interface module fastening body 317 may protrude radially inward from the opening 313 at a portion of the inner circumference of the opening 313. For example, the interface module fastening body 317 may protrude in a radially inner direction of the opening 313 at a portion of the inner circumference of the opening 313. In this case, the radially inner direction of the opening 313 may mean the front lower direction. In addition, a reinforcing rib 317B for reinforcing the interface module fastening body 317 may be formed on a back surface of the interface module fastening body 317.

The first tilting housing 311 may be provided with a supporter fastening body (or supporter fastening extension) 318 to be fastened to the tilting supporter 330. For example, the supporter fastening body 318 may be formed to extend from an edge in the interface module fastening body 317. In one example, the supporter fastening body 318 may be formed below the interface module fastening body 317. The supporter fastening body 318 may include a first supporter fastening portion (or first supporter fastening boss) 318A to be described later.

In one configuration, the tilting housing 310 may include a plurality of supporter fastening portions (or supporter fastening bosses) 318A, 319A, and 319B to be fastened to the tilting supporter 330. Some of the plurality of supporter fastening portions 318A, 319A, and 319B (e.g., supporter fastening portions 318A, 319A) and 319B may be formed in the first tilting housing 311, and others thereof (e.g., supporter fastening portions 319B) may be fastened to the second tilting housing 312.

In some situations, the first tilting housing 311 is more vulnerable to an external shock due to the opening 313. Therefore, in order to more intensively reinforce the first tilting housing 311, a quantity of the supporter fastening portions 318A and 319A formed in the first tilting housing 311 may be larger than a quantity of the supporter fastening portions 319B formed in the second tilting housing 312. For example, the first tilting housing 311 may be provided with four supporter fastening portions 318A and 319A, and the second tilting housing 312 may be provided with one supporter fastening portion 319B.

The first tilting housing 311 may be provided with the first supporter fastening portion 318A and the second supporter fastening portion 319A, and the second tilting housing 312 may be provided with the third supporter fastening portion 319B. In one example, the first supporter fastening portion 318A may be fastened to the first fastening portion 331 of the tilting supporter 330 (see FIG. 12), the second supporter fastening portion 319A may be fastened to the second fastening portion 333 of the tilting supporter 330 (see FIG. 12), and the third supporter fastening portion 319B may be fastened to the third fastening portion 335 of the tilting supporter 330 (see FIG. 12).

The first supporter fastening portion 318A may be formed at a position higher on the first tilting housing 311 than the second supporter fastening portion 318B. For example, the vertical distance from the lower end of the first tilting housing 311 to the first supporter fastening portion 318A may be longer than the vertical distance from the lower end of the first tilting housing 311 to the second supporter fastening portion 318B.

The first supporter fastening portion 318A may be formed in the supporter fastening body 318, and the second supporter fastening portion 319A may be formed on the inner surface of the first tilting housing 311. For example, the first supporter fastening portion 318A may include a fastening boss protruding rearward from the back surface of the supporter fastening body 318, and the second supporter fastening portion 319A may include a fastening boss protruding rearward from the inner surface of the first tilting housing 311. It should be appreciated, however, that other configurations are possible, and the configuration of the first and second supporter fastening portions 318A and 319A may be changed, as needed.

A plurality of first supporter fastening portions 318A and a plurality of second supporter fastening portions 319A may be formed. In some situations, the inner circumference of the opening 313 may be relatively vulnerable to an impact. Therefore, in order to reinforce the circumference of the opening 313, each of the supporter fastening portions 318A and 319A may be formed at a position adjacent to the opening 313. In addition, the first supporter fastening portion 318A may be disposed closer to the upper portion 313A of the opening 313, and the second supporter fastening portion 319A may be disposed closer to the lower portion 313B of the opening 313, such that the circumference of the opening 313 may be more uniformly reinforced.

In the second tilting housing 312, the third supporter fastening portion (or third supporter fastening boss) 319B may include a protrusion portion protruding forward from the inner surface of the second tilting housing 312, and a fastening hole formed in the protrusion portion. However, the configuration of the third supporter fastening portion 319B may be changed as needed.

In addition, the second tilting housing 312 may include a support member (or support brace) 315 for supporting the tilting supporter 330. The support member 315 may be formed separately from the second tilting housing 312 and may be fastened to the second tilting housing 312. In another example, the support member 315 may be integrally formed with the second tilting housing 312.

The support member 315 may be provided on the inner surface of the second tilting housing 312. For example, the support member 315 may be provided on the upper inner surface of the second tilting housing 312. The support member 315 may be disposed at a position higher than that of the third supporter fastening portion 319B.

The support member 315 may include a contact portion (or contact surface) 315A that is positioned to be in contact with the tilting supporter 330 in the assembled robot 1. In one example, the contact portion 315A may be in contact with the back surface of the tilting supporter 330 and support the tilting supporter 330 in the front-rear direction.

The first tilting housing 311 may include first tilting base connecting portions (or first tilting base connecting ribs) 314A and first tilting base connecting portions (or first tilting base connecting bosses) 316A connected to one side of the tilting base 320. Similarly, the second tilting housing 312 may include second tilting base connecting portions (or second tilting base connecting ribs) 314B and second tilting base connecting portions (or second tilting base connecting bosses) 316B connected to the other side of the tilting base 320. For example, the first tilting base connecting portions 314A and 316A may be connected to the front portion of the tilting base 320, and the second tilting base connecting portions 314B and 316B may be connected to the rear portion of the tilting base 320.

The first tilting base connecting portions 314A and 316A may be formed at the lower portion of the first tilting housing 311. For example, the vertical distance from the lower end of the first tilting housing 311 to the first tilting base connecting portions 314A and 316A may be shorter than the vertical distance from the upper end of the first tilting housing 311 to the first tilting base connecting portions 314A and 316A.

The second tilting base connecting portions 314B and 316B may be formed at the lower portion of the second tilting housing 312. For example, the vertical distance from the lower end of the second tilting housing 312 to the second tilting base connecting portions 314B and 316B may be shorter than the vertical distance from the upper end of the second tilting housing 312 to the second tilting base connecting portions 314B and 316B.

In addition, the first tilting base connecting portions 314A and 316A in the first tilting housing 311 may be formed at positions lower than those of the first and second supporter fastening portions 318A and 319A. The second tilting base connecting portions 314B and 316B in the second tilting housing 312 may be formed at positions lower than that of the third supporter fastening portions 319B.

The first tilting base connecting portions 314A and 316A may include at least one of a first tilting base fixing portion (or first tilting base connecting rib) 314A to which one side of the tilting base 320 is fitted and fixed, or a first tilting base fastening portion (or first tilting base connecting boss) 316A to be fastened to one side of the tilting base 320 by a fastening member such as a screw.

A first housing fixing portion (or front edge) 324A of the tilting base 320 (see FIG. 13) may be inserted and fitted into a region associated with the first tilting base fixing portion 314A. The first tilting base fixing portion 314A may be formed on the inner surface of the first tilting housing 311. In one example, the first tilting base fixing portion 314A may include a pair of ribs spaced apart at an interval corresponding to the thickness of the first housing fixing portion 324A, such that the first housing fixing portion 324A of the tilting base 320 is inserted and fitted thereinto. The pair of ribs preferably extend along the inner circumference of the first tilting housing 311 in the horizontal direction.

The first tilting base fastening portion 316A may be fastened to the first housing fastening portion (or first housing fastening boss) 324B of the tilting base 320 (see FIG. 13) by a fastening member such as a screw. The first tilting base fastening portion 316A may be formed on the inner surface of the first tilting housing 311. For example, the first tilting base fastening portion 316A may include a fastening boss protruding rearward from the inner surface of the first tilting housing 311. A plurality of first tilting base fastening portions 316A may be formed. In addition, the first tilting base fastening portion 316A may be formed at a position higher than that of the first tilting base fixing portion 314A.

The second tilting base connecting portions 314B and 316B may include at least one of a second tilting base fixing portion 314B to which the other side of the tilting base 320 is fitted and fixed, or a second tilting base fastening portion 316B to be fastened to the other side of the tilting base 320 by a fastening member such as a screw. A second housing fixing portion (or rear edge) 325A of the tilting base 320 (see FIG. 13) may be inserted and fitted into the second tilting base fixing portion 314B.

The second tilting base fixing portion 314B may be formed on the inner surface of the second tilting housing 312. For example, the second tilting base fixing portion 314B may include a pair of ribs spaced apart at an interval corresponding to the thickness of the second housing fixing portion 325A, such that the second housing fixing portion 325A of the tilting base 320 is inserted and fitted thereinto. The pair of ribs preferably extend along the inner circumference of the second tilting housing 312 in the horizontal direction.

The second tilting base fastening portion 316B may be fastened to the second housing fastening portion (or second housing fastening boss) 325B of the tilting base 320 (see FIG. 13) by a fastening member such as a screw. The second tilting base fastening portion 316B may be formed on the inner surface of the second tilting housing 312. For example, the second tilting base fastening portion 316B may include a protrusion portion protruding forward from the inner surface of the second tilting housing 312, and a fastening hole formed in the protrusion portion. In addition, the second tilting base fastening portion 316B may be formed at a position higher than that of the second tilting base fixing portion 314B.

Auxiliary tilting base connecting portions 314C and 316C may be formed on the inner surface of the tilting housing 310. The auxiliary tilting base connecting portions 314C and 316C may be formed in the first tilting housing 311 and/or the second tilting housing 312. At least one pair of auxiliary tilting base connecting portions 314C and 316C may be formed. For example, one of the auxiliary tilting base connecting portions 314C and 316C may be formed on the left inner surface of the tilting housing 310, and the other thereof may be formed on the right inner surface of the tilting housing 310.

Each of the auxiliary tilting base connecting portions 314C and 316C may include at least one of an auxiliary tilting base fixing portion (or auxiliary tilting base connecting ribs) 314C to which the auxiliary housing fixing portion (or auxiliary tilting base connecting edge) 328A of the tilting base 320 (see FIG. 13) is fitted and fixed, or an auxiliary tilting base fastening portion (or (or auxiliary tilting base connecting boss) 316C to be fastened to the auxiliary housing fastening portion (or auxiliary housing fastening boss) 328B of the tilting base 320 (see FIG. 13) by a fastening member, such as a screw.

Hereinafter, an example in which the auxiliary tilting base fixing portion 314C is formed in the second tilting housing 312 and the auxiliary tilting base fastening portion 316C is formed in the first tilting housing 311 will be described. The auxiliary housing fixing portion 328A of the tilting base 320 may be inserted and fitted into the auxiliary tilting base fixing portion 314C.

The auxiliary tilting base fixing portion 314C may be formed on the inner surface of the second tilting housing 312. The auxiliary tilting base fixing portion 314C may be formed at a position adjacent to the edge 312A of the second tilting housing 312. For example, the auxiliary tilting base fixing portion 314C may include a pair of ribs spaced apart at an interval corresponding to the thickness of the auxiliary housing fixing portion 328A, such that the auxiliary housing fixing portion 328A of the tilting base 320 may be inserted and fitted thereinto.

The auxiliary tilting base fastening portion 316A may be fastened to the auxiliary housing fastening portion 328B of the tilting base 320 by a fastening member such as a screw. The auxiliary tilting base fastening portion 316C may be formed on the inner surface of the first tilting housing 311. The auxiliary tilting base fastening portion 316C may be formed at a position adjacent to the edge 311A of the first tilting housing 311.

For example, the auxiliary tilting base fastening portion 316C may include a fastening boss protruding rearward from the inner surface of the first tilting housing 311. In addition, the auxiliary tilting base fastening portion 316C may be formed at a position higher than that of the auxiliary tilting base fixing portion 314C.

Figure 11:
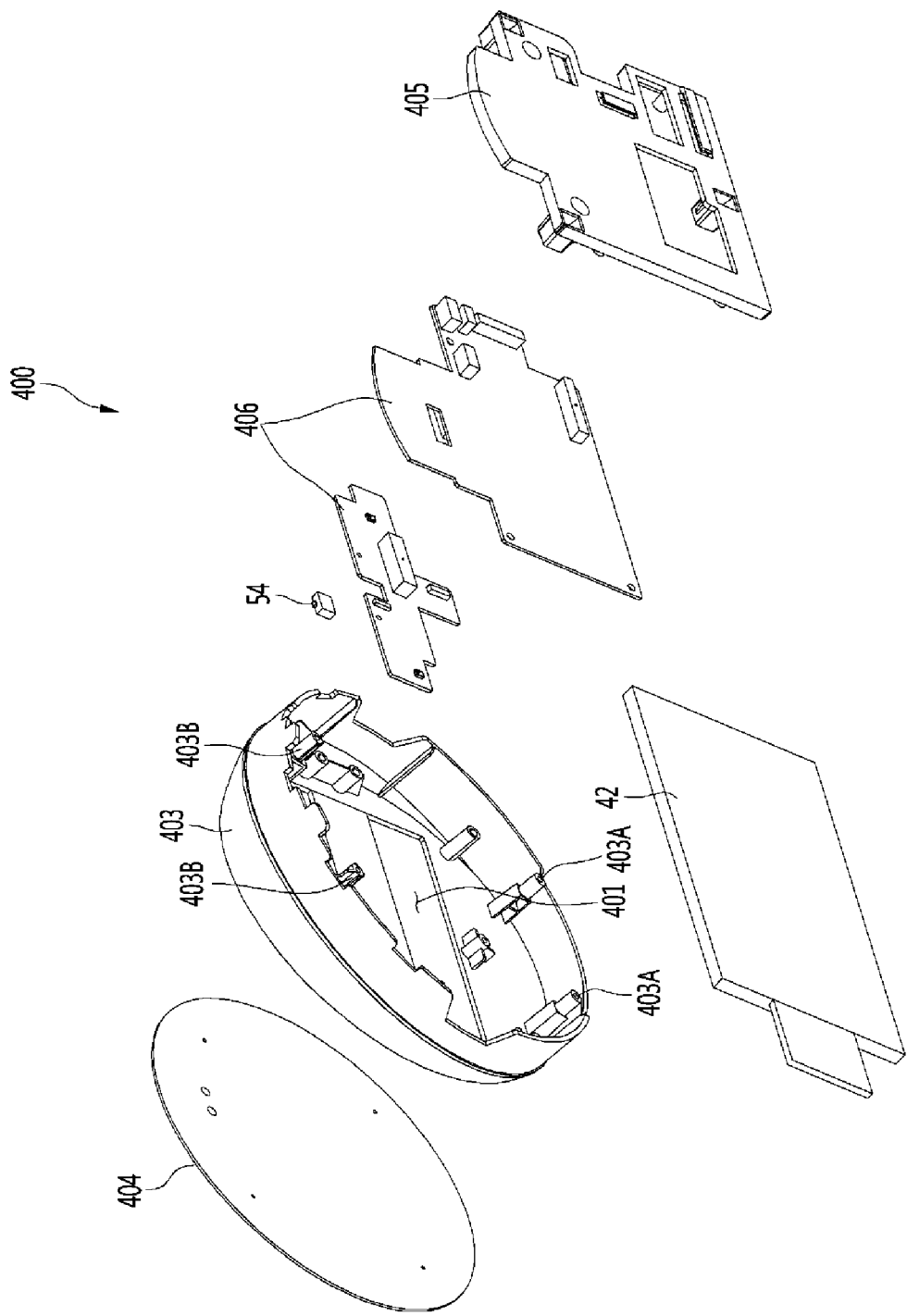
FIG. 11 is an exploded perspective view of an interface module according to an embodiment.

FIG. 11 is an exploded perspective view of the interface module 400 according to one embodiment. The interface module 400 may include an interface case 403 mounted on the first tilting housing 311, at least one interface (e.g., an output device such as a screen) 42 and (e.g., an input device or sensor, such as a camera) 54 disposed in the interface case 403, a front cover (or screen) 404 covering substantially the entire front surface of the interface case 403, and a back cover 405 coupled to the interface case 403.

The interface case 403 may be opened at the back surface, and at least one opening 401 may be formed on the front surface. The interface case 403 may have a shape corresponding to the opening 313 formed in the first tilting housing 311 and may be inserted into the opening 313.

The interface module 400 may include various interfaces that visually interact with the user. For example, the first interface module 400 may include a display 42 to output visual data and a camera 54 to capture visual data.

A first opening 401 in which the display 42 is positioned to be visible to a user and a second opening (not illustrated) in which the camera 54 is disposed so that the camera 54 may capture an image of an exterior of the robot 1 may be formed on the front surface of the interface case 403. At least part of the display 42 may be exposed forward of the interface case 403 through the first opening 401, and at least part of the camera 54 may be exposed forward of the interface case 403 through the second opening.

The front cover 404 may substantially cover the front surface of the interface case 403. At least part of the front cover 404 may be made of a transparent or translucent material. For example, a portion of the front cover 404 corresponding to the opening 401 formed in the interface case 403 may be made of a transparent or translucent material. Therefore, the image displayed on the display 42 may be delivered to the user through the front cover 404, and the camera 54 may capture an image through the front cover 404.

The back cover 405 may be disposed inside the interface case 403 and may be fastened to the interface case 403. The back cover 405 may be disposed behind the interfaces 42 and 54. For example, the interfaces 42 and 54 may be mounted on the front of the back cover 405 and protected between the front cover 404 and the back cover 405.

The interface module 400 may be provided with an interface PCB 406 that includes various processors, memories, power components and other circuitry for activating and controlling the interfaces 42 and 54. The interface PCB 406 may be mounted on the back cover 405, and the back cover 405 may function as a PCB bracket. The interface PCB 406 may be protected between the back cover 405 and the front cover 404.

At least one of the interface case 403 or the back cover 405 may be provided with a sub-supporter fastening portion (or sub-supporter fastening boss) 403A to be fastened to the tilting supporter 330. For example, the sub-supporter fastening portion 403A may be formed in the interface case 403, as illustrated in FIG. 11. The sub-supporter fastening portion 403A may be fastened to the sub-fastening portion (or sub-fastening portion plate) 334 of the tilting supporter 330 (see FIG. 12).

The sub-supporter fastening portion 403A may be formed at the lower portion of the interface case 403, and may include a plurality of fastening bosses protruding rearward from the front surface of the interface case 403. However, the configuration of the sub-supporter fastening portion 403A is not limited thereto.

In addition, at least one of the interface case 403 or the back cover 405 may be provided with a sub-housing fastening portion (or sub-housing fastening boss) 403B to be fastened to the interface module fastening body 317 of the first tilting housing 311 (see FIG. 9). For example, the sub-supporter fastening portion 403A may be formed in the interface case 403, as illustrated in FIG. 11.

The sub-housing fastening portion (or interface case fastening region) 403B may be formed on the upper portion of the interface case 403. The sub-housing fastening portion 403B may include a fastening boss, and the fastening member such as a screw may be fastened to the fastening boss through the fastening hole 317A (see FIG. 9) formed in the interface module fastening body 317.

Figure 12:
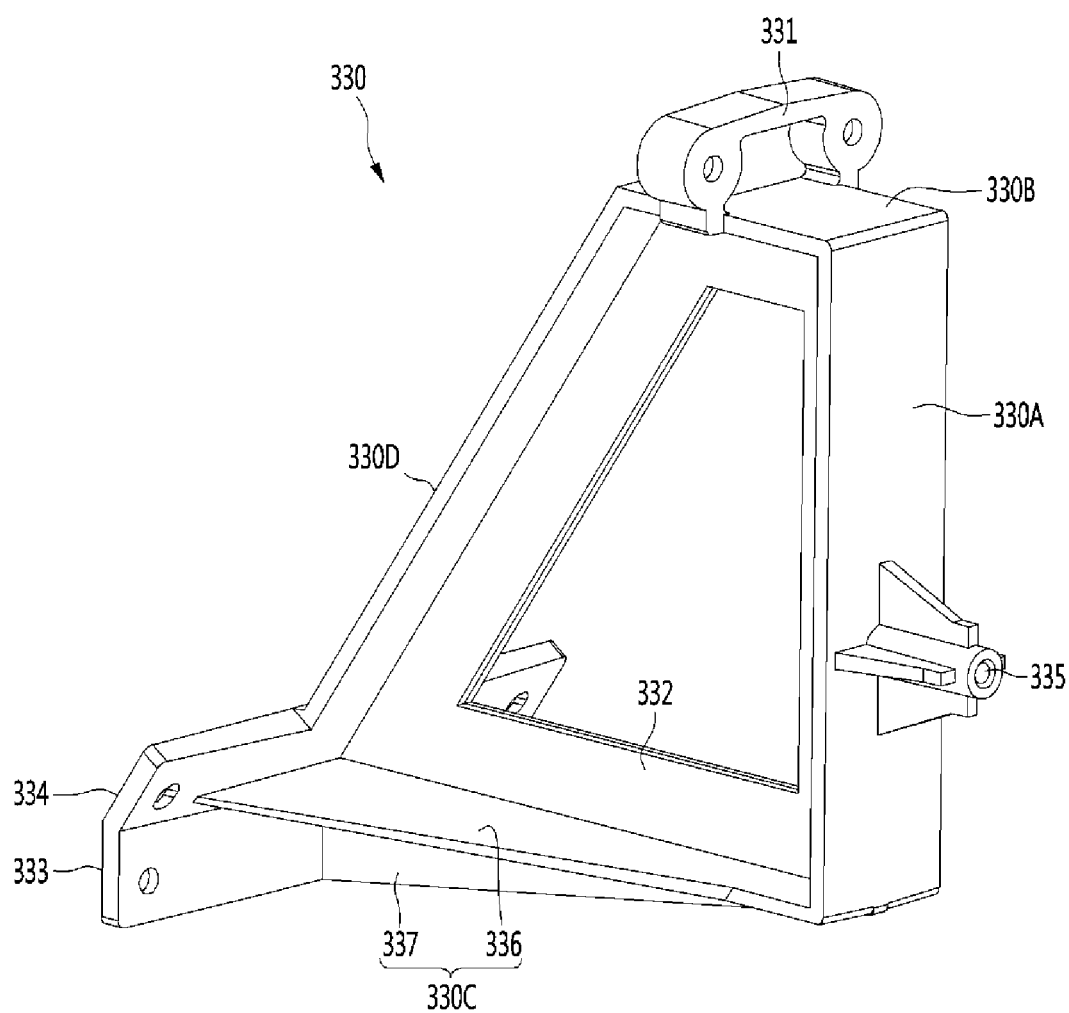
FIG. 12 is a perspective view of a tilting supporter according to an embodiment.

FIG. 12 is a perspective view of the tilting supporter (or tilting supporting frame) 330 according to an embodiment. The tilting supporter 330 may connect the first tilting housing 311 and the second tilting housing 312. Hereinafter, an example in which the tilting supporter 330 extends in the front-rear direction will be described.

The tilting supporter 330 may be provided with a plurality of fastening portions 331, 333, and 335 to be fastened to the tilting housing 310. Some of the plurality of fastening portions 331, 333, and 335 formed on the tilting supporter 330 may be fastened to the first tilting housing 311, and others thereof may be fastened to the second tilting housing 312.

For example, the tilting supporter 330 may be provided with a first fastening portion (or first fastening body) 331 and a second fastening portion (or second fastening portion wall) 333 to be fastened to the first tilting housing 311, and a third fastening portion (or third fastening protrusion or boss) 335 fastened to the second tilting housing 312.

For example, the first fastening portion 331 may be fastened to the first supporter fastening portion 318A (see FIG. 9) formed in the first tilting housing 311. The second fastening portion 333 may be fastened to the second supporter fastening portion 319A formed in the first tilting housing 311. The third fastening portion 335 may be fastened to the third supporter fastening portion 319B (see FIG. 10) formed in the second tilting housing 312. The fastening portions 331, 333, and 335 and the supporter fastening portions 318A, 319A, and 3196 may be fastened by fastening members, such as a screw.

The first fastening portion 331 may be formed on the upper portion of the tilting supporter 330. The first fastening portion 331 may include a fastening body provided on the upper portion of the tilting supporter 330, and at least one fastening hole penetrating the fastening body in the front-rear direction. The second fastening portion 333 may be formed at the front lower portion of the tilting supporter 330. The second fastening portion 333 may include a fastening body (or plate) extending from the tilting supporter 330 in the horizontal direction, and at least one fastening hole penetrating the fastening body in the front-rear direction. The third fastening portion 335 may be formed on the rear portion of the tilting supporter 330. The third fastening portion 335 may include a fastening boss protruding rearward from the back surface of the tilting supporter 330. However, the configurations of the first, second, and third fastening portions 331, 333, and 335 are not limited thereto, and may be changed as needed.

The tilting supporter 330 may further include a sub-fastening portion (or sub-fastening plate) 334 to be fastened to the interface module 400. For example, the sub-fastening portion 334 may be fastened to the sub-supporter fastening portion 403A (see FIG. 11) formed in the interface module 400. The sub-fastening portion 334 and the sub-supporter fastening portion 403A may be fastened by at least one fastening member, such as a screw. The sub-fastening portion 334 may be formed on the front lower side of the tilting supporter 330 to be near or adjacent to the second fastening portion 333. In one example, the sub-fastening portion 334 may be integrally formed with the second fastening portion 333.

The sub-fastening portion 334 may include a fastening body (or plate) extending from the tilting supporter 330 in the horizontal direction, and at least one fastening hole penetrating the fastening body. When the interface module 400 is obliquely mounted on the first tilting housing 311, the fastening hole included in the sub-fastening portion 334 may also be obliquely formed. It should be appreciated, however, the configuration of sub-fastening portion 334 is not limited thereto, and may be changed as needed.

The tilting supporter 330 may be formed in a polygonal (e.g., trapezoidal) frame shape. In this configuration, a geometrical rigidity of the tilting supporter 330 may be increased as compared to when the tilting supporter 330 has a bar shape, and the weight of the tilting supporter 330 may be reduced as compared to when the tilting supporter 330 has a plate shape. In another example, the tilting supporter 330 may also have a ring shape.

The tilting supporter 330 may include a first frame (or first frame section) 330A extending in the vertical direction, a second frame (or second frame section) 330B extending from the upper end of the first frame 330A in the horizontal direction, a third frame (or third frame section) 330C extending from the lower end of the first frame 330A in the horizontal direction, and a fourth frame (or fourth frame section) 330D connecting the second frame 330B and the third frame 330C.

The first frame 330A may extend in the vertical direction. The third fastening portion 335 may be formed on the back surface of the first frame 330A. The second frame 330B may extend from the upper end of the first frame 330A toward the first tilting housing 311. For example, the second frame 330B may extend horizontally, such as along a front-rear direction. The first fastening portion 331 may be formed on the top surface of the second frame 330B.

The third frame 330C may extend from the lower end of the first frame 330A toward the first tilting housing 311. That is, the third frame 330C may extend horizontally, such as in the front-rear direction in parallel with the second frame 330B. The length of the third frame 330C may be longer than the length of the second frame 330B such that the tilting supporter 330 has a trapezoidal shape when viewed in profile. The second fastening portion 333 may be formed at the front end of the third frame 330C.

The third frame 330C may include a horizontal portion (or horizontal plate) 336 horizontally extending forward from the lower end of the second frame 330B, and a vertical portion (or vertical plate) 337 vertically protruding from the bottom surface of the horizontal portion 336. In one example, the second fastening portion 333 may extend from the front end of the vertical portion 337 in the horizontal direction.

The horizontal width of the horizontal portion 336 may increase toward the first tilting housing 311, and the vertical height of the vertical portion 337 may increase toward the first tilting housing 311. For example, the horizontal width of the horizontal portion 336 may increase toward the front side, and the vertical height of the vertical portion 337 may increase toward the front side. Therefore, as the tilting supporter 330 gets closer to the first tilting housing 311, the geometrical rigidity thereof may be increased, and the opening 313 may be formed to effectively reinforce the first tilting housing 311 that is relatively vulnerable to an impact.

The fourth frame 330D may extend to connect the end of the second frame 330B and the end of the third frame 330C.

Since the length of the third frame 330C is longer than the length of the second frame 330B, the fourth frame 330D may be obliquely formed at an angle such that the vertical height thereof is decreased toward the front side.

The sub-fastening portion 334 may be formed at the lower end of the fourth frame 330D. The sub-fastening portion 334 may extend from the lower end of the fourth frame 330D in the horizontal direction. In addition, the sub-fastening portion 334 may have a bent shape at the upper end of the second fastening portion 333. The sub-fastening portion 334 and the second fastening portion 333 may have a same horizontal length. The back surface of the sub-fastening portion 334 may be connected to the horizontal portion 336 such that the horizontal portion 336 reinforces a strength of the sub-fastening portion 334.

A reinforcing rib 332 protruding inward from the inner circumference of the tilting supporter 330 may be formed in the tilting supporter 330, thereby further increasing the rigidity of the tilting supporter 330. The reinforcing rib 332 may protrude inward of the tilting supporter 330 on the inner surface of one or more of the first, second, third, and fourth frames 330A, 330B, 330C, and 330D.

Figure 13:
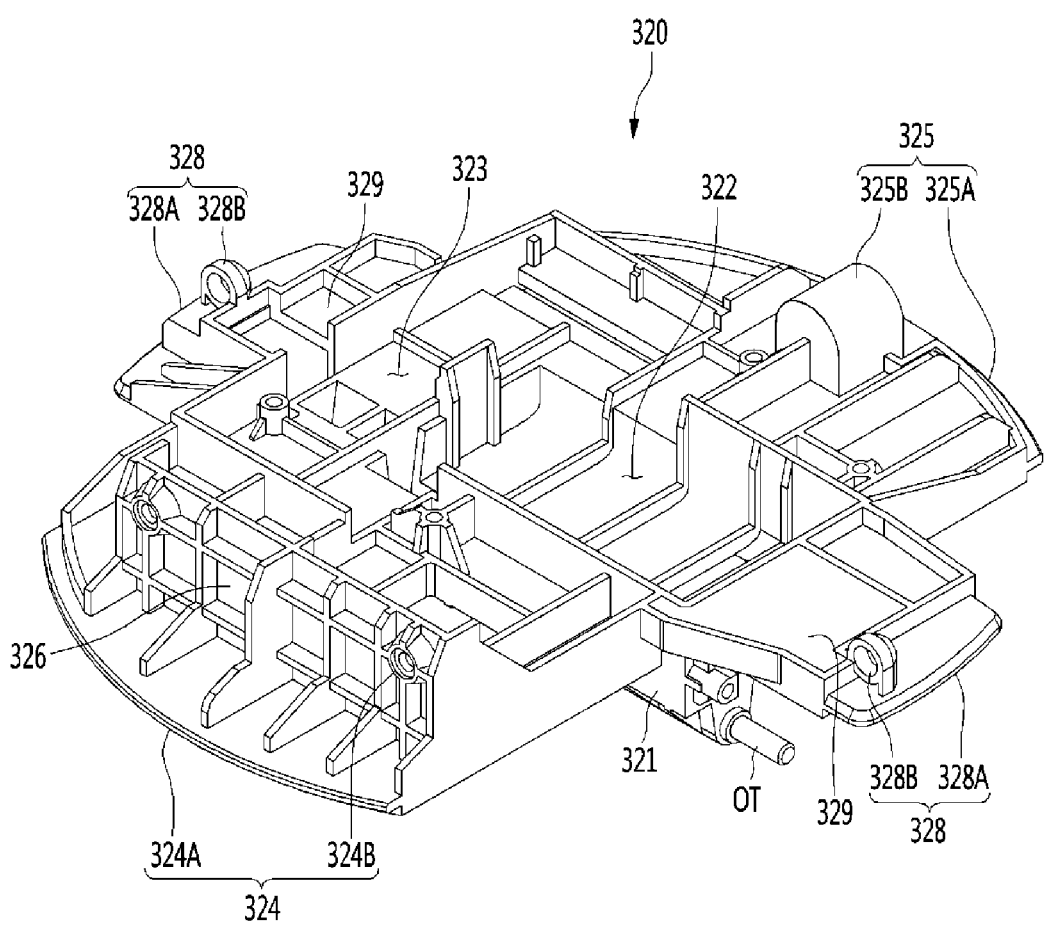
FIG. 13 is a perspective view of a tilting base according to an embodiment.

FIG. 13 is a perspective view of the tilting base 320 according to an embodiment. The tilting base 320 may have a substantially horizontal plate shape. In one example, the tilting base 320 may be elongated in the front-rear direction.

The tilting base 320 may be provided with a tilting shaft connecting portion (or tilting shaft connecting protrusion) 321 to which the tilting shaft OT (see FIG. 8) is connected. The tilting shaft connecting portion 321 may be formed at the lower portion of the tilting base 320. The tilting shaft OT may extend in the horizontal direction and be connected to the tilting shaft connecting portion 321.

In addition, the battery mounting portion (or battery mounting portion region) 322 on which the battery 34 (see FIG. 8) is mounted may be formed in the tilting base 320. The battery mounting portion 322 may include a pocket (or opening) formed on the top surface of the tilting base 320 that is sized to receive the battery 34. The battery mounting portion 322 may be formed substantially in a central portion of the tilting base 320 so that a center or gravity for a weight of the battery is positioned near the rotational axis OS, but is not limited thereto.

The PCB mounting portion (or PCB mounting region) 323 on which the intermediate PCB 340 (see FIG. 8) is mounted may be formed in the tilting base 320. The PCB mounting portion 323 may include a pocket formed on the top surface of the tilting base 320.

The connecting portions 324 and 325 may be formed in the tilting base 320. For example, a first connecting portion 324 connected to the inside of the first tilting housing 311 may be formed at one side of the tilting base 320, and a second connecting portion 325 connected to the inside of the second tilting housing 312 may be formed on the other side of the tilting base 320.

For example, the first connecting portion 324 may be formed on the front portion of the tilting base 320, and the second connecting portion 325 may be formed on the rear portion of the tilting base 320. In this case, the first connecting portion 324 may be disposed in front of the battery mounting portion 322 and the PCB mounting portion 323, and the second connecting portion 325 may be disposed behind the battery mounting portion 322 and the PCB mounting portion 323.

The first connecting portion 324 may include at least one of a first housing fixing portion (or first housing fixing rib) 324A fitted and fixed to the inside of the first tilting housing 311, or a first housing fastening portion (or first housing fixing boss) 324B fastened to the inside of the first tilting housing 311 by a fastening member, such as a screw, The first housing fixing portion 324A may have a horizontal rib shape having a predetermined thickness. The first housing fixing portion 324A may be inserted and fitted into the first tilting base fixing portion 314A (see FIG. 9) formed in the first tilting housing 311. The end of the first housing fixing portion 324A may be rounded so as to correspond to the horizontal inner circumference of the first tilting housing 311.

The first housing fastening portion (or first housing fastening boss) 324B may include at least one fastening hole formed in the front-rear direction. More specifically, the tilting base 320 may be provided with a reinforcing wall 326 vertically disposed on the top surface of the tilting base 320, and the first housing fastening portion 324B may be formed in the reinforcing wall 326. However, the configuration of the first housing fastening portion 324B is not limited thereto. The first housing fastening portion 324B may be fastened to the first tilting base fastening portion 316A of the first tilting housing 311 (see FIG. 9) by a fastening member such as a screw. The first housing fastening portion 324B may be disposed above the first housing fixing portion 324A.

In addition, the second connecting portion 325 may include at least one of a second housing fixing portion (or second housing fixing rib) 325A fitted and fixed to the inside of the second tilting housing 312, or a second housing fastening portion (or second housing fixing boss) 325B fastened to the inside of the second tilting housing 312 by a fastening member such as a screw, The second housing fixing portion 325A may have a horizontal rib shape having a predetermined thickness. The second housing fixing portion 325A may be inserted and fitted into the second tilting base fixing portion 3146 (see FIG. 10) formed in the second tilting housing 312. The end of the second housing fixing portion 325A may be rounded so as to correspond to the horizontal inner circumference of the second tilting housing 312.

The second housing fastening portion 325B may include a fastening boss facing the rear side. However, the configuration of the second housing fastening portion 325B is not limited thereto. The second housing fastening portion 325B may be fastened to the second tilting base fastening portion 316B of the second tilting housing 312 (see FIG. 10) by a fastening member, such as a screw. The second housing fastening portion 325B may be disposed above the second housing fixing portion 325A.

The tilting base 320 may further include at least one auxiliary connecting portion 328 disposed between the first connecting portion 324 and the second connecting portion 325 in the circumferential direction of the tilting base 320, and configured to be connected to the inside of the tilting housing 310. For example, the tilting base 320 may be provided with a pair of wing portions 329 protruding from the tilting base 320 in the horizontal direction, and the auxiliary connecting portions 328 may be formed in each of the wing portions 329.

The auxiliary connecting portion 328 may include at least one of an auxiliary housing fixing portion (or auxiliary housing fixing portion rib) 328A fitted and fixed to the inside of the tilting housing 310, and an auxiliary housing fastening portion (or auxiliary housing fastening loop) 328B fastened to the inside of the tilting housing 310 by a fastening member such as a screw.

The auxiliary housing fixing portion 328A may have a horizontal rib shape having a predetermined thickness. The auxiliary housing fixing portion 328A may be inserted and fitted into the auxiliary tilting base fixing portion 314C (see FIG. 10) formed in the tilting housing 310. The end of the auxiliary housing fixing portion 328A may be rounded so as to correspond to the horizontal inner circumference of the tilting housing 310.

The auxiliary housing fastening portion 328B may include at least one fastening hole formed in the front-rear direction. However, the configuration of the auxiliary housing fastening portion 328B is not limited thereto. The auxiliary housing fastening portion 328B may be fastened to the auxiliary tilting base fastening portion 316C of the tilting base 320 (see FIG. 9) by a fastening member such as a screw. In one example, the auxiliary housing fastening portion 328B may be disposed on the upper side of the auxiliary housing fixing portion 328A.

Figure 14:
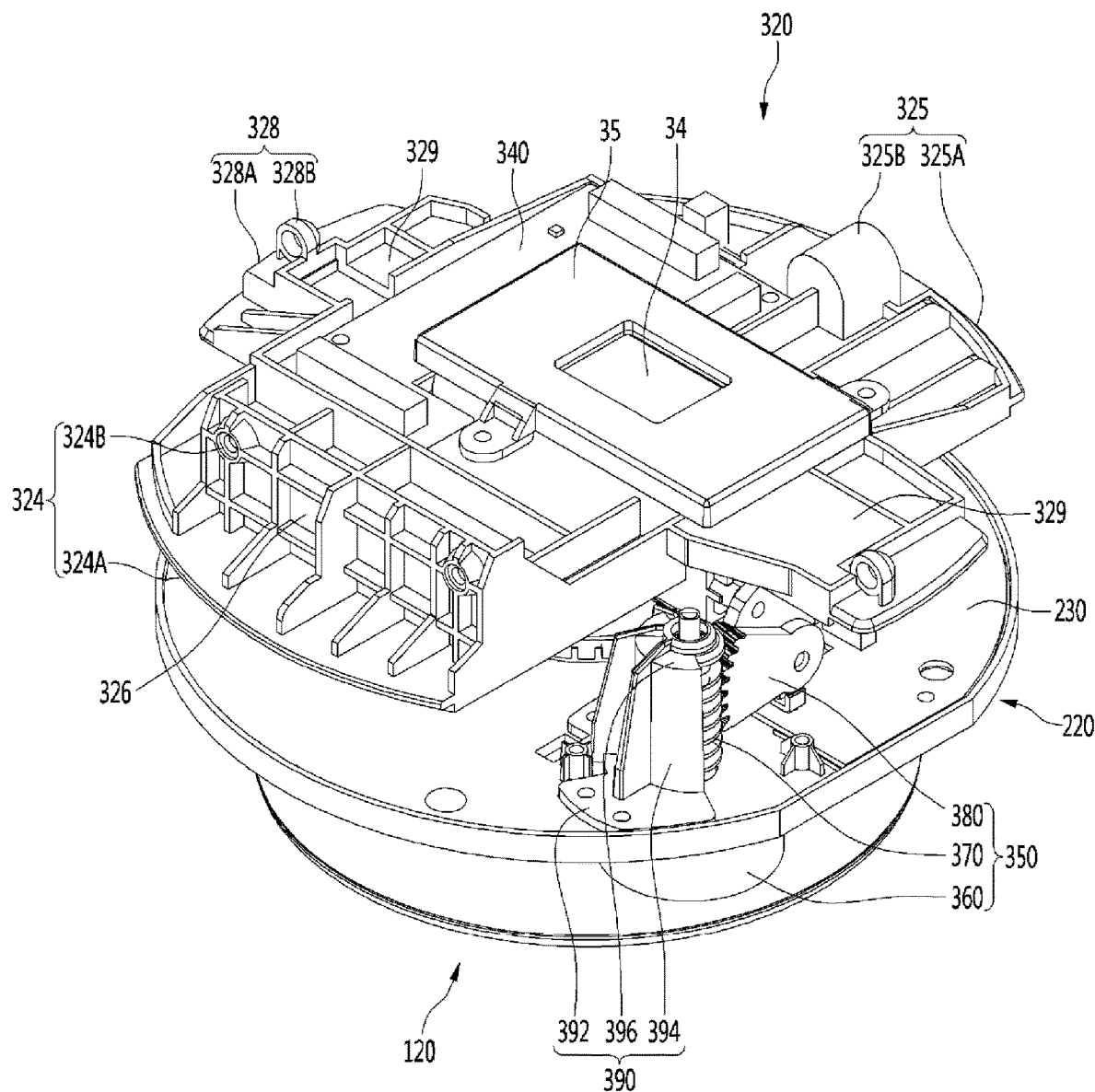
FIG. 14 is a perspective view illustrating a base, a spin cover, a tilting mechanism, and a tilting base according to an embodiment.
Figure 15:
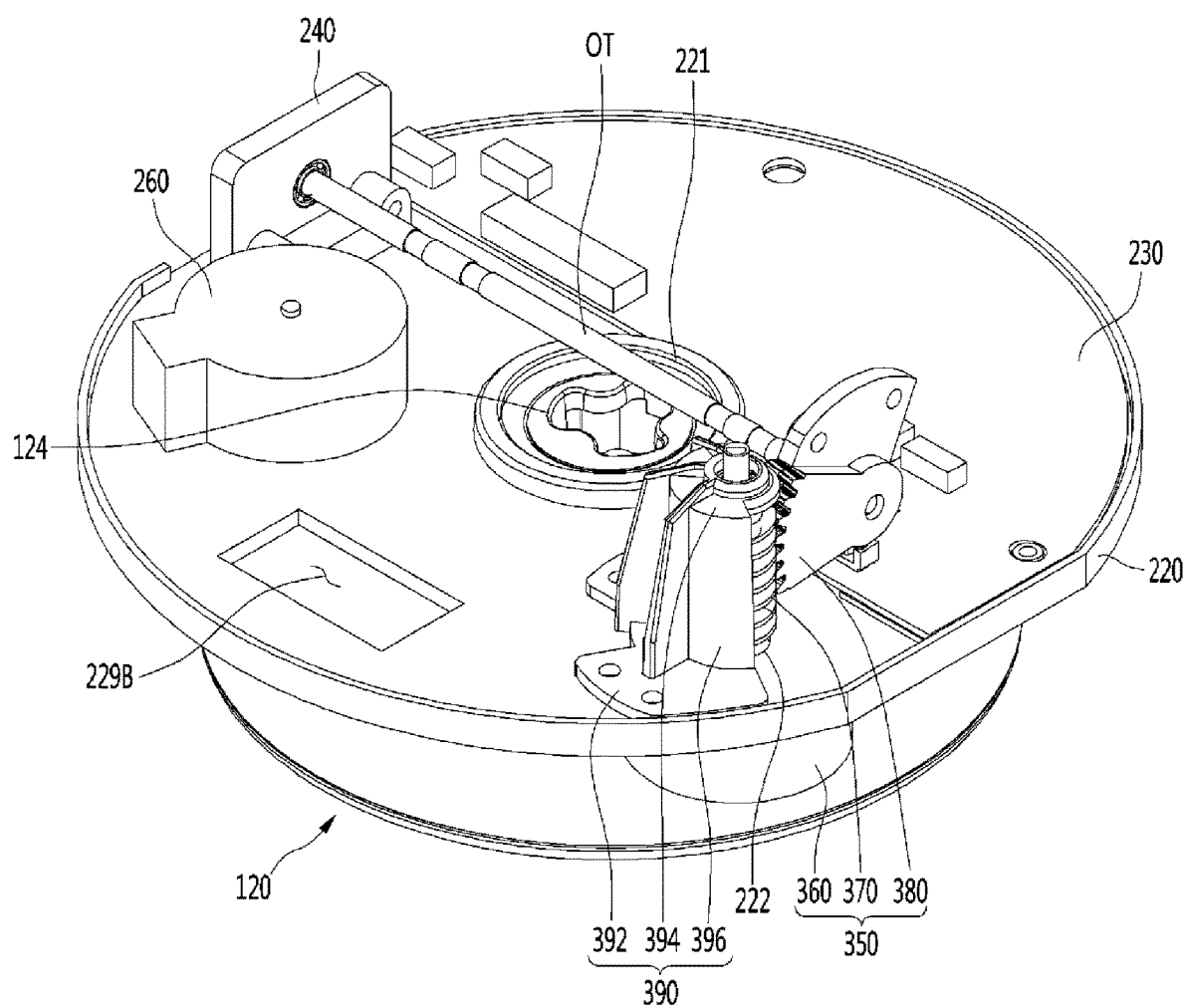
FIG. 15 is a perspective view illustrating a state in which the tilting base illustrated in FIG. 14 is separated.
Figure 16:
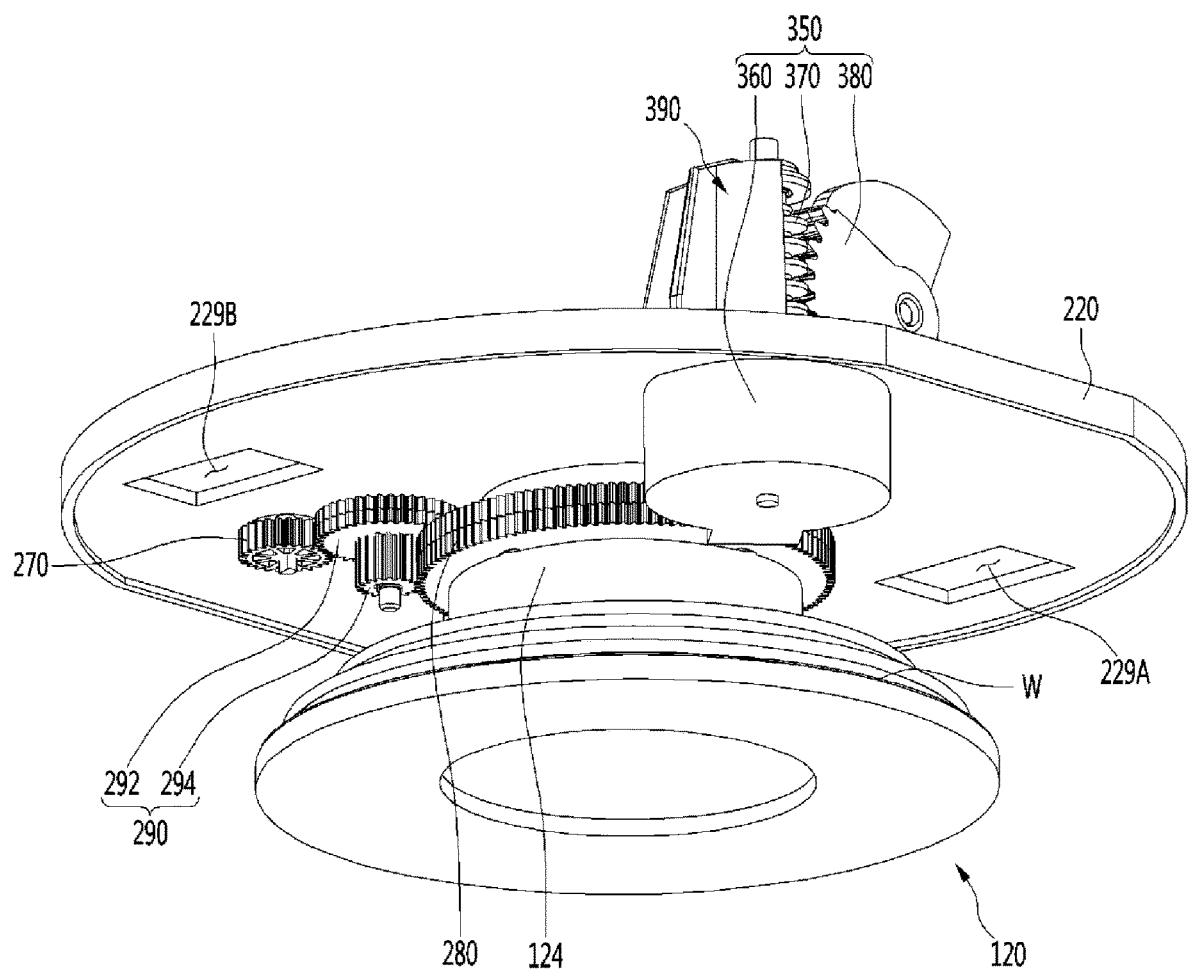
FIG. 16 is a bottom perspective view illustrating the base, the spin cover, the spin mechanism, and the tilting mechanism according to an embodiment.

As shown in FIGS. 14-16, the driving PCB 230 in one implementation may be eccentrically disposed on one side of the top surface of the spin cover 220. The spin motor 260, the tilting driving gear 370, the tilting driven gear 380, and the gear supporter 390 may also be disposed on the top surface of the spin cover 220, and the driving PCB 230 may be eccentrically disposed at a position where the driving PCB 230 does not interfere with the spin motor 260, the tilting driving gear 370, the tilting driven gear 380, and the gear supporter 390.

The driving PCB 230 may be horizontally disposed on the spin cover 220. The top surface of the driving PCB 230 may face the bottom surface of the tilting base 320. The driving PCB 230 may be protected by the spin cover 220 and the tilting base 320.

The driving PCB 230, when disposed on the top surface of the spin cover 220, may be electrically connected to the tilting motor 360 accommodated in the space S2 by a connecting member (not illustrated), such as a wire. The spin cover 220 may include at least one first through-hole 229A through which the connecting member connecting the driving PCB 230 and the tilting motor 360 passes. The first through-hole 229A may be formed under the driving PCB 230 and may be covered by the driving PCB 230.

In addition, the driving PCB 230, when disposed on the top surface of the spin cover 220, may be electrically connected to an interface component, such as a speaker 44, accommodated in the space S2 by a connecting member (not illustrated), such as a wire. The spin cover 220 may be provided with at least one second through-hole 229B through which the connecting member connecting the driving PCB 230 and the interface 44 passes. The second through-hole 229B may be formed at a position spaced apart from the first through-hole 229A and may not be covered by the driving PCB 230. In another example (not shown), the second through-hole 229B is not separately formed in the spin cover 220, and instead, the connecting member connecting the driving PCB 230 and the interface 44 may pass through the first through-hole 229A.

As previously described, the spin mechanism 250 may include the spin motor 260, the spin driving gear 270, and the spin driven gear 280. The spin mechanism 250 may further include the spin intermediate gear 290. The spin motor 260 may be disposed between the outer circumference of the spin cover 220 and the fixed shaft connecting portion 221 with respect to the radial direction of the spin cover 220.

The spin motor 260 may be disposed on the top surface of the spin cover 220, and the driving shaft of the spin motor 260 may protrude below the spin motor 260. For example, the spin motor 260 may be disposed between the spin cover 220 and the tilting base 320, and the spin motor 260 may be covered by or otherwise protected by the spin cover 220 and the tilting base 320. The driving shaft of the spin motor 260 may extend vertically below the spin motor 260. The driving shaft of the spin motor 260 may protrude toward the space S2 inside the spin body 200.

The spin driving gear 270 may be disposed in the space S2 inside the spin body 200 and may be connected to the driving shaft of the spin motor 260. The spin driving gear 270 may be coupled to the driving shaft of the spin motor 260. The spin driving gear 270 and the spin motor 260 may be disposed one opposite surfaces of the spin cover 220. For example, the spin cover 220 may be provided with a through-hole through which at least one of the driving shaft of the spin motor 260 or the rotational shaft of the spin driving gear 270 passes. At least one of the driving shaft of the spin motor 260 or the rotational shaft of the spin driving gear 270 may be disposed in the through-hole of the spin cover 220.

The spin driven gear 280 may be fixed to the base 100. For example, the spin driven gear 280 may be a fixed gear that is fixedly mounted to the fixed shaft 126 of the base 100. The diameter of the spin driven gear 280 may be larger than the diameter of the spin driving gear 270.

The spin driving gear 270 may be directly engaged with the spin driven gear 280. For example, the spin driving gear 270 may rotate while revolving along the outer circumference of the spin driven gear 280.

In another example, the spin driving gear 270 may not directly engage the spin driven gear 280, and the spin driving gear 270 and the spin driven gear 280 may be connected via the spin intermediate gear 290. The spin intermediate gear 290 may be rotatably connected to the spin cover 220. The spin intermediate gear 290 may be accommodated in the space S2 inside the spin body 200, like the spin driving gear 270.

The spin intermediate gear 290 may transmit power between the spin driving gear 270 and the spin driven gear 280. For example, the spin intermediate gear 290 may rotate based on force received from the spin driving gear 270 to revolve around the outer circumference of the spin driven gear 280.

As shown in FIG. 16, the spin intermediate gear 290 may include a first intermediate gear 292 engaged with the spin driving gear 270, and a second intermediate gear 294 rotated together with the first intermediate gear 292 and engaged with the spin driven gear 280. The diameter of the first intermediate gear 292 may be larger than the diameter of the second intermediate gear 294, and first intermediate gear 292 and the second intermediate gear 294 may be axially coupled or otherwise colinear so that the rotational shafts of the first intermediate gear 292 and the second intermediate gear 294 may coincide with each other. With this configuration, it is possible to prevent the spin body 200 from rotating too fast when the spin motor 260 is driven, while the torque necessary for rotating the spin body 200 may be sufficiently secured.

As described above, the tilting mechanism 350 may include the tilting motor 360 accommodated in the space S2 inside the spin body 200, the tilting driving gear 370 having a lower side connected to the tilting motor 360, and the tilting driven gear 380 connected to the tilting shaft OT or the tilting body 300 and engaged with the tilting driving gear 370 on the spin cover 220.

The tilting motor 360 may be disposed below the spin cover 220, and the tilting driven gear 380 may be disposed above the spin cover 220. For example, the tilting motor 360 and the tilting driven gear 380 may be positioned on opposite sides of the spin cover 220. The power of the tilting motor 360 may be transmitted to the tilting driven gear 380 through the tilting driving gear 370.

The spin cover 220 may be provided with a through-hole through which at least one of the driving shaft of the spin motor 260 or the rotational shaft of the spin driving gear 270 passes. The through-hole in the spin cover 220 may be formed in the vertical direction, and at least one of the driving shaft of the tilting motor 360 or the tilting driving gear 370 may be disposed in the through-hole.

The driving shaft of the tilting motor 360 may be disposed in a direction intersecting with the tilting shaft OT. For example, the tilting shaft OT may extend in a horizontal direction, and the tilting motor 360 may be mounted on the spin cover 220 with the driving shaft extending in a vertical direction.

The driving shaft of the tilting motor 360 may be parallel to the driving shaft of the spin motor 260. For example, the driving shaft of the tilting motor 360 and the driving shaft of the spin motor 260 may extend in the vertical direction, and the driving shaft of the tilting motor 360 and the driving shaft of the spin motor 260 may be spaced from each other in the horizontal direction.

The tilting motor 360 may be disposed between the outer circumference of the spin cover 220 and the fixed shaft connecting portion 221 with respect to the radial direction of the spin cover 220. For example, the tilting motor 360 may be positioned to be spaced away from the spin drive gear 280.

The tilting driving gear 370 may be connected to the tilting motor 360 and be rotated. The tilting driving gear 370 may be a worm gear disposed vertically. The tilting driving gear 370 may be vertically disposed on the upper side of the spin cover 220 while being connected to the tilting motor 360. For example, the tilting driving gear 370 may include a gear portion having gear teeth formed to extend in a spiral pattern on an outer circumference thereof, a lower rotational shaft protruding from the lower side of the gear portion, and an upper rotational shaft protruding at the upper side of the gear portion. The gear portion of the tilting driving gear 370 may be engaged with the tilting driven gear 380. The lower rotational shaft including the lower end of the tilting driving gear 370 may be connected to the tilting motor 360, and the upper rotational shaft including the upper end of the tilting driving gear 370 may be rotatably supported by the gear supporter 390.

The tilting driven gear 380 may be disposed above the spin cover 220 and may be connected to at least one of the tilting shaft OT or the tilting body 300. The tilting driven gear 380 may be a spur gear that rotates about the tilting shaft OT. The tilting driven gear 380 may be connected to at least one of the tilting shaft OT or the tilting base 320 so as to tilt the tilting body 300.

The gear supporter 390 may be mounted on the spin cover 220 and may rotatably support the tilting driving gear 370. The gear supporter 390 may be connected to the upper portion of the tilting driving gear 370. The gear supporter 390 may include a lower fastening portion (or lower fastening plate) 392 fastened to the spin cover 220, a rotational shaft supporting portion (or upper fastening plate) 394 rotatably supporting the upper rotational shaft of the tilting driving gear 370, and a connecting portion (or connecting plate) 396 connecting the lower fastening portion 391 and the rotational shaft supporting portion 394.

The lower fastening portion 392 may be fastened to or otherwise be coupled to the top surface of the spin cover 220. The lower fastening portion 392 may be provided with a fastening hole that extends in the vertical direction, and a fastening member such as a screw may be fastened to the spin cover 220 through the fastening hole.

The connecting portion 396 may be disposed to surround part of the outer circumference of the tilting driving gear 370, particularly, the gear portion. A space for accommodating the tilting driving gear 370 may be formed in the wall of the connecting portion 396. The connecting portion 396 may have a convex shape to receive and protect the tilting driving gear 370 at a side opposite to the tilting driven gear 380. The tilting driving gear 370 may rotate about the upper rotational shaft and the lower rotational shaft vertically extending while being accommodated in the space formed inside the connecting portion 396.

Additionally, the spin cover 220 may include a fixed shaft connecting portion (or fixed shaft connection region) 221 to which the fixed shaft 126 of the base 100 (see FIG. 17) is connected. The fixed shaft connecting portion 221 may be formed at the central portion of the spin cover 220. The fixed shaft connecting portion 221 may be formed to penetrate the spin cover 220 in the vertical direction and may be substantially circular. The fixed shaft connecting portion 221 may be rotatably coupled to the fixed shaft 126 of the base 100 inserted thereinto. For example, a portion of the fixed shaft 126 may be received in the fixed shaft connecting portion 221 so that the spin cover 220 may rotate relative to the base 100 around the fixed shaft 126. The virtual vertical center axis of the fixed shaft connecting portion 221 may substantially coincide with the rotational axis of the rotational shaft OS (FIGS. 5 to 7) of the spin body 200.

Figure 4:
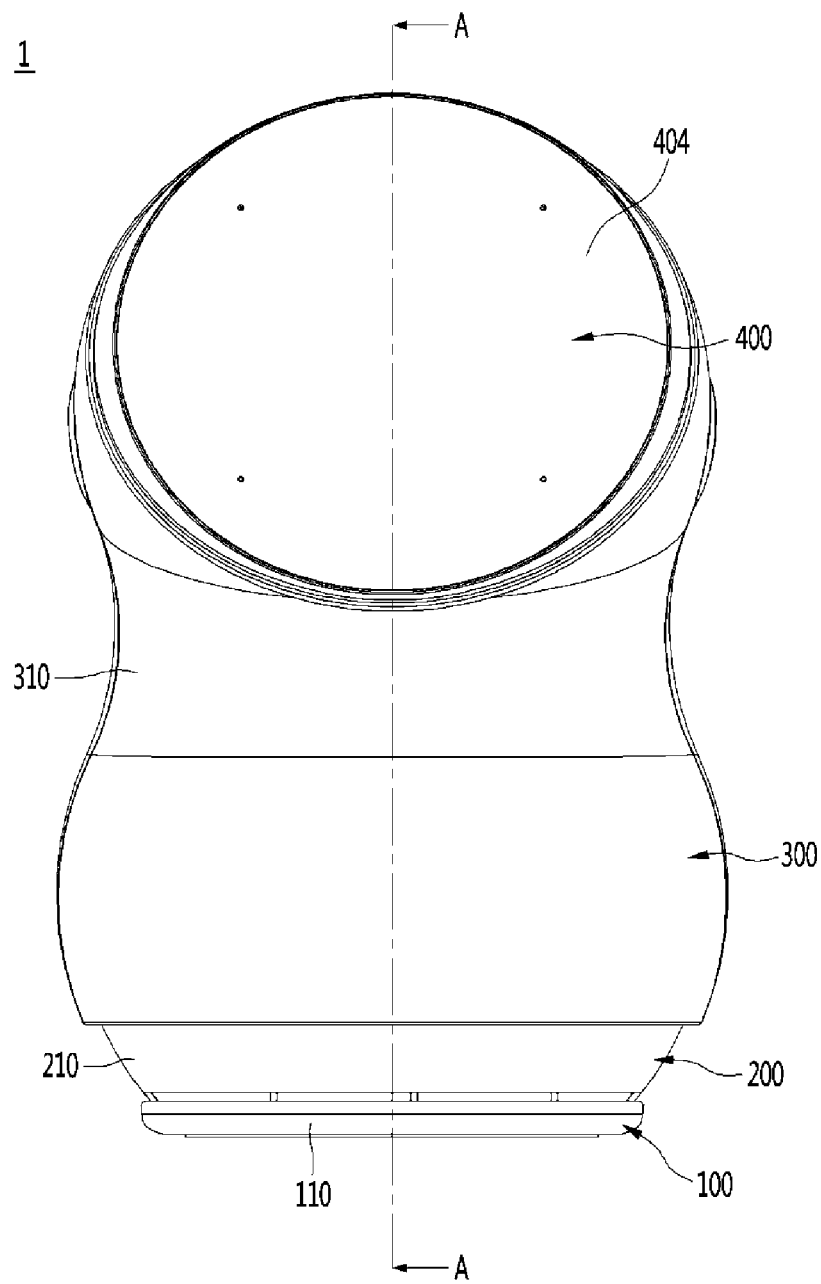
FIG. 4 is a front view of the robot according to the embodiment.
Figure 5:
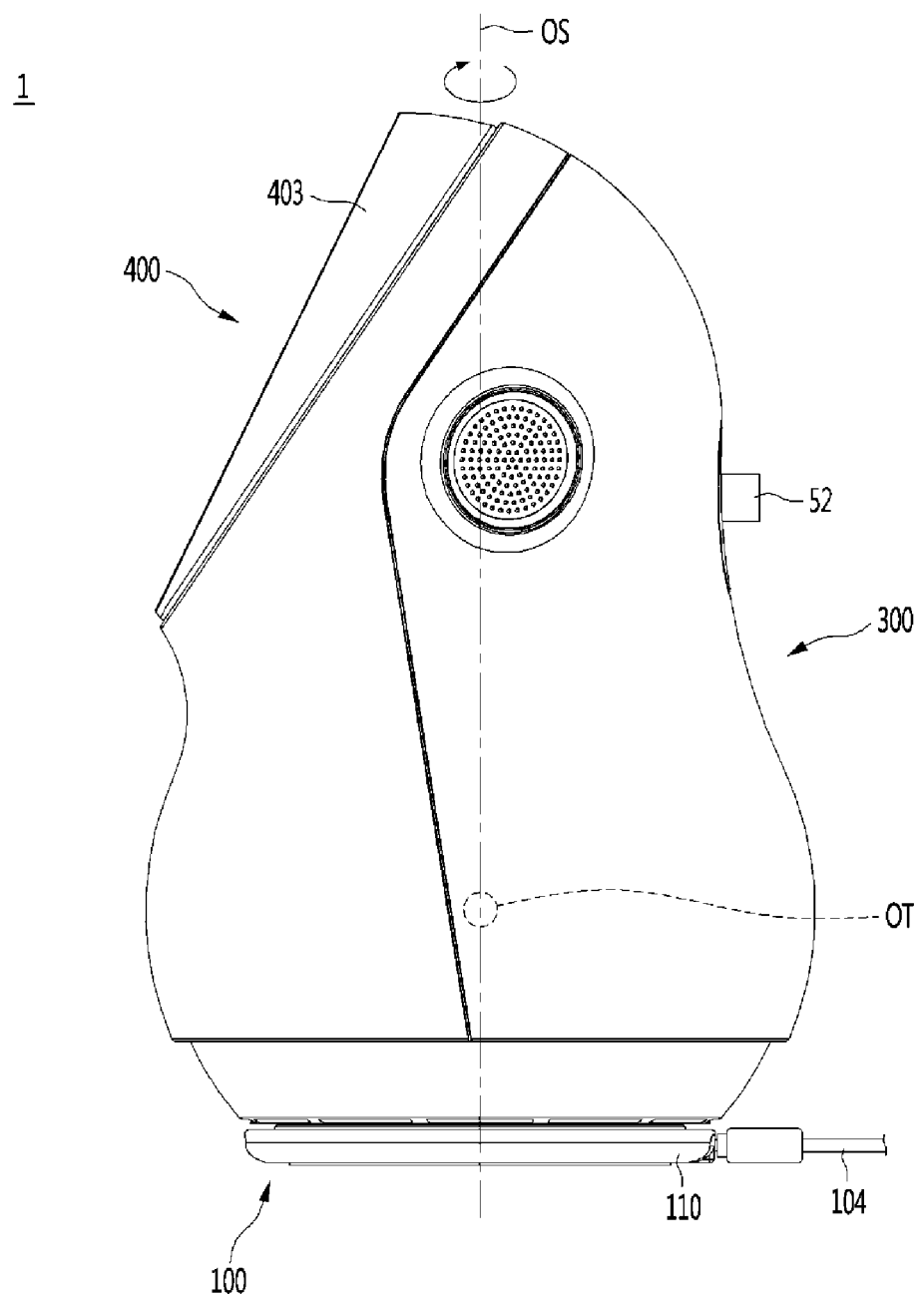
FIG. 5 is a front view illustrating a state in which a rotating body of the robot according to the embodiment is rotated in one direction.
Figure 6:
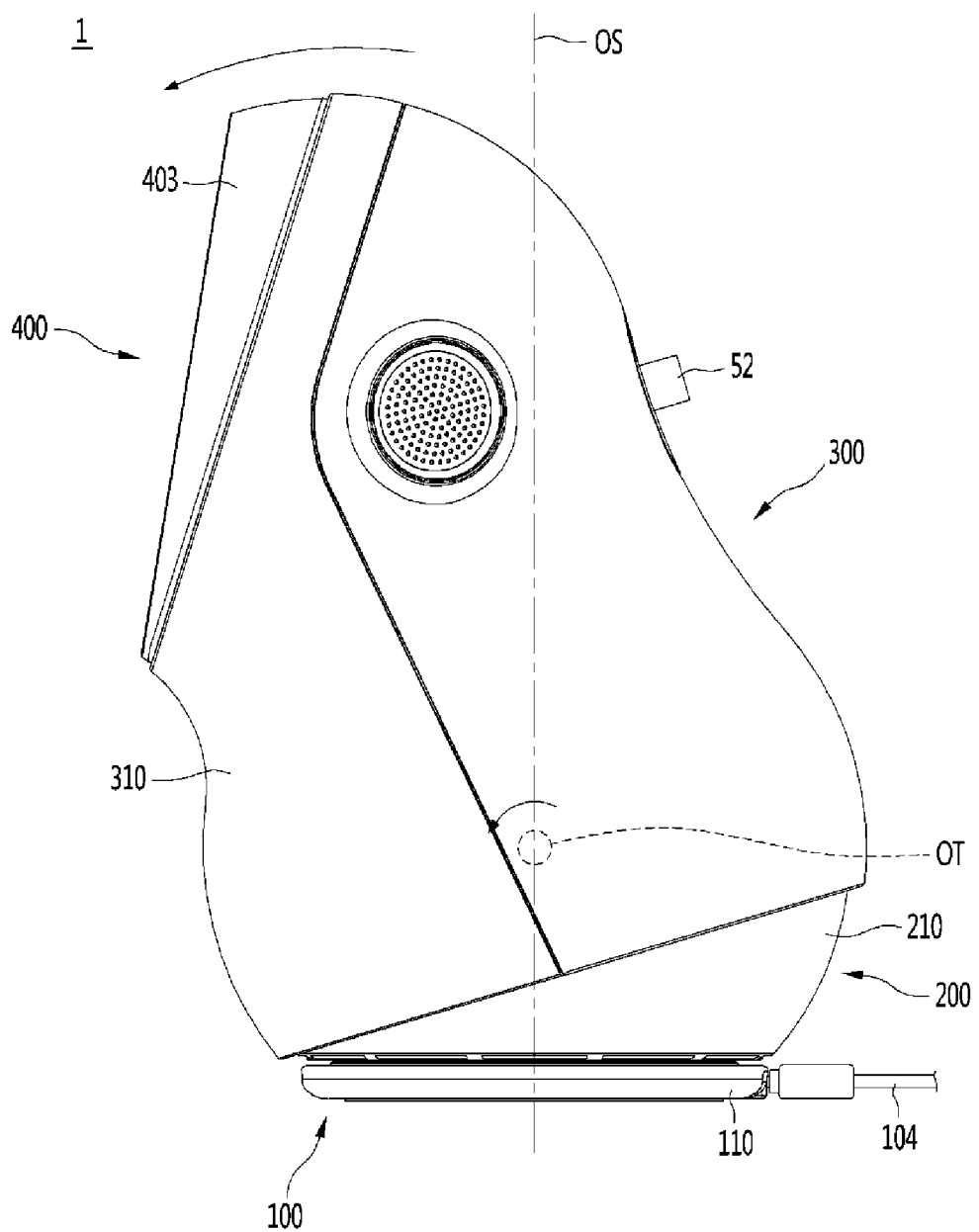
FIG. 6 is a side view illustrating a state in which a tilting body of the robot according to the embodiment is tilted forward.
Figure 7:
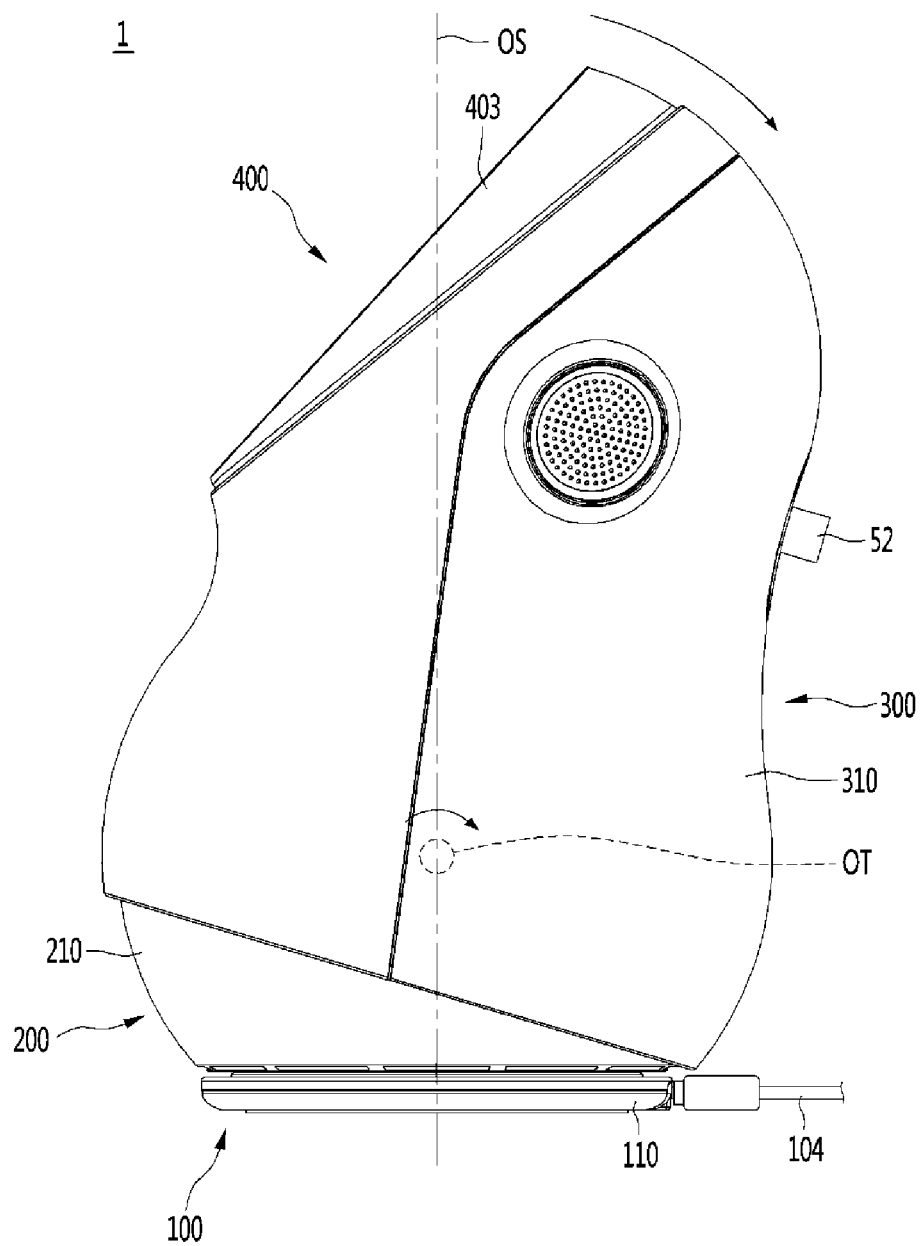
FIG. 7 is a side view illustrating a state in which the tilting body of the robot according to the embodiment is tilted rearward.
Figure 17:
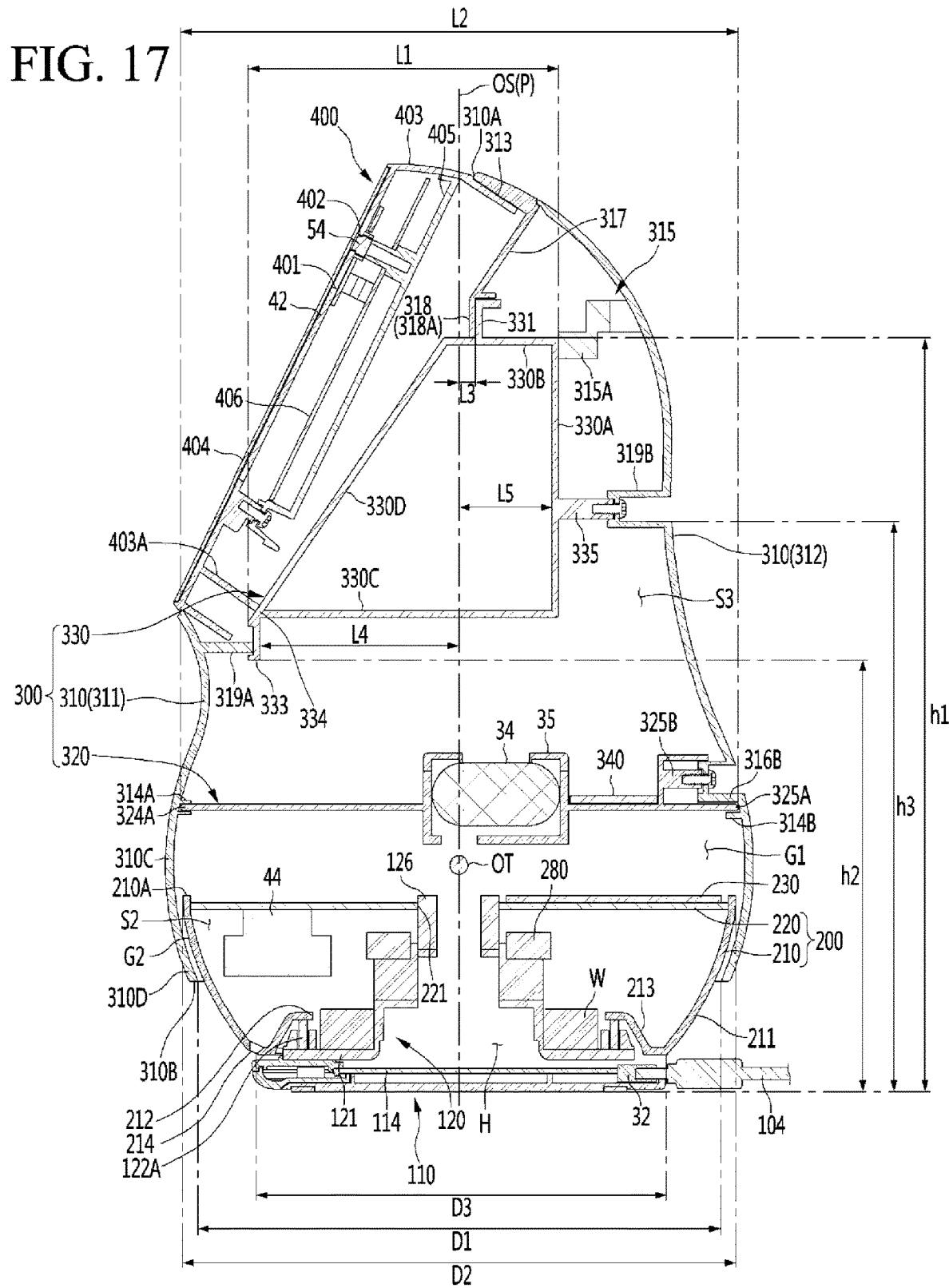
FIG. 17 is a cross-sectional view taken along line A-A' of FIG. 4.
Figure 18:
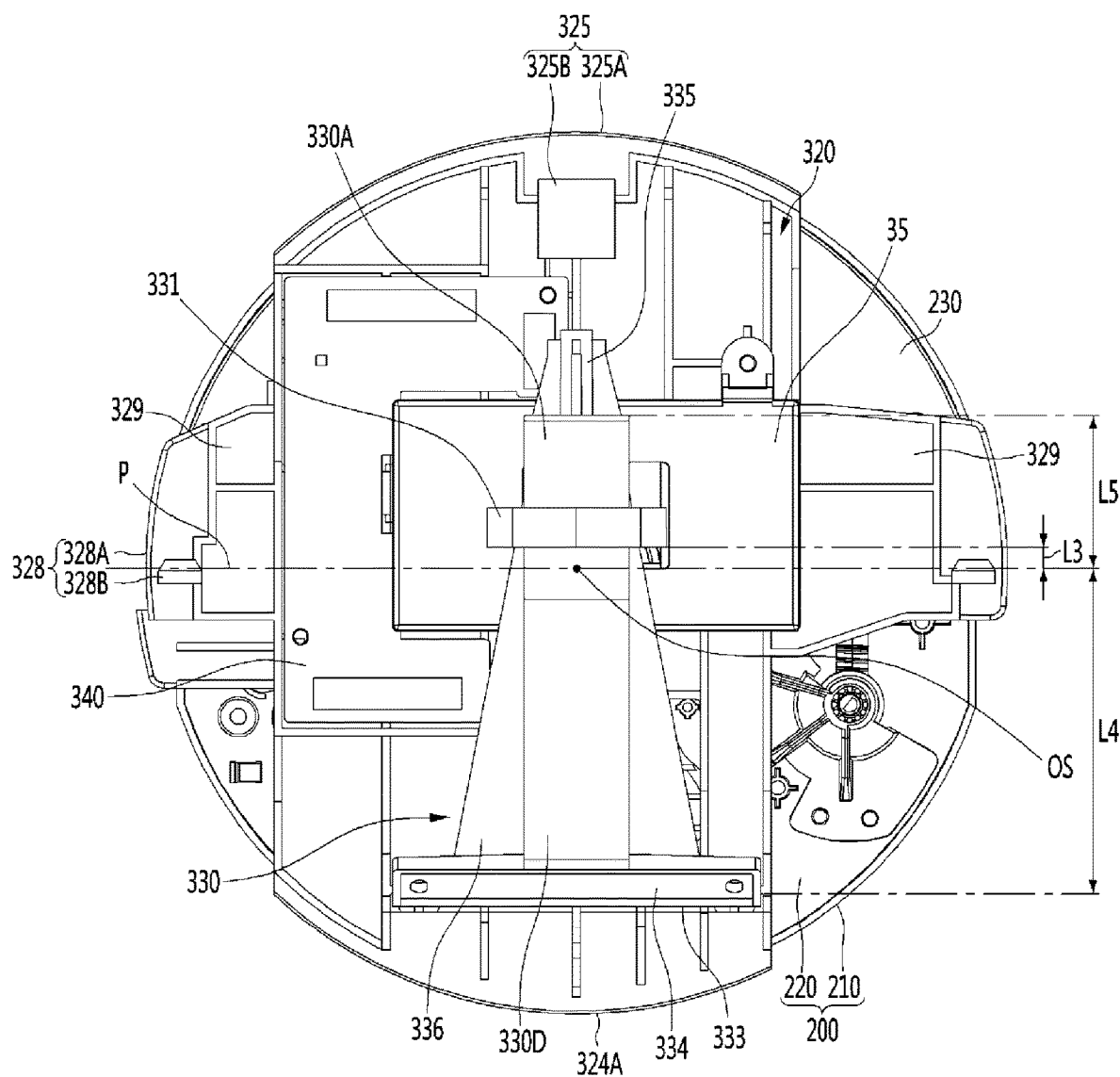
FIG. 18 is a plan view illustrating a state in which a tilting housing and an interface module are removed in the robot according to the embodiment.

FIG. 17 is a cross-sectional view of the robot 1 taken along line A-A' of FIG. 4, and FIG. 18 is a plan view of the robot 1 illustrating when which the tilting housing 310 and the interface module 400 are removed in the robot according to the embodiment. The base 100 may include a base body 110, and a spin body connecting portion 120 which is disposed on the upper side of the base body 110 and to which the spin body 200 is rotatably connected.

The robot 1 may further include a base PCB 114 disposed in the base 100. The base PCB 114 may be disposed in the base body 110. The base PCB 114 may be electrically connected to the power connection unit 32 disposed in the base body 110. The power connection unit 32 may be connected to a power cord 104 to receive power from an external power supply.

As previously described, the spin driven gear 280 may be fixed to the spin body connecting portion 120. The spin driven gear 280 may be fixedly mounted on the spin body connecting portion 120 and may guide the spin body 200 to rotate.

At least one of the interface PCB 406, the driving PCB 230, or the intermediate PCB 340, and the base PCB 114 may be electrically connected by a connecting member (not illustrated), such as a wire. In this case, a hollow cavity (H) through which the connecting member passes may be formed in the spin body connecting portion 120. The central axis of the hollow H may coincide with the rotational shaft OS of the spin body 200.

In one example, the spin body connecting portion 120 may include a spin body supporter (or spin body connecting plate) 121 and a fixed shaft 126. The spin body supporter 121 may rotatably support the spin body 200. The spin body supporter 121 may be disposed on the top surface of the base body 110.

The spin body supporter 121 may include a rolling member 122A contacting the spin body 200. The rolling member 122A may include at least one of a roller, a ball, or a bearing. The rolling member 122A mat be rotatably mounted on the spin body supporter 121. The rolling member 122A may protrude from the top surface of the spin body supporter 121. The rolling member 122A may contact a portion of the spin body 200, such as the spin housing 210, and may help smooth rotation of the spin body 200.

A plurality of rolling members 122A may be provided in the spin body supporter 121. The plurality of rolling members 122A may be disposed along a virtual circle, and the plurality of rolling members 122A may transmit the load acting on the spin body 200 to the base 100, particularly, the spin body supporter 121 in a distributed manner.

A weight body (or weight) W capable of increasing the weight or mass of the base 100 may be disposed in the base 100. In one example, the weight body W is an object having a larger weight than a volume, and may lower the center of gravity of the robot 1 and help the robot 1 to not to overturn. The weight body W may be disposed on the top surface of the spin body supporter 121.

The fixed shaft 126 may be formed in a hollow cylindrical shape and may be connected to the fixed shaft connecting portion 221 formed in the spin cover 220. For example, the fixed shaft 126 may be inserted into the fixed shaft connecting portion 221, and the spin body 200 may rotate about the fixed shaft 126. That is, the vertical center axis of the fixed shaft 126 may coincide with the rotational axis OS of the spin body 200.

Furthermore, the spin housing 210 may have a shape in which the top surface thereof is opened and the diameter thereof is reduced toward the lower side. The outer surface of the spin housing 210 may be convex toward the outside. The outer diameter of the upper end 210A of the spin housing 210 may be larger than the outer diameter of the lower end 2106 of the spin housing 210.

The spin housing 210 may include an upper hollow body (or outer spin housing) 211. The upper hollow body 211 may have a space S2 in which the tilting motor 360 and the speaker 44 may be accommodated, and the diameter thereof may be reduced toward the lower side.

The spin housing 210 may further include a lower hollow body (or inner spin housing) 213. The lower hollow body 213 may extend from the lower end of the upper hollow body 211 toward the space S2 formed inside the upper hollow body 211.

A base through-hole 212 through which part of the base 100 passes may be formed at the center of the lower hollow body 213. The base through-hole 212 may be vertically formed in the lower hollow body 213.

The spin housing 210 may be provided with an acoustic hole 214 through which the sound generated from the speaker 44 exits the spin body 200. The acoustic hole 214 may be formed between the upper hollow body 211 and the lower hollow body 213. A plurality of acoustic holes 214 may be formed in the spin housing 210, and the plurality of acoustic holes 214 may be spaced from each other in the circumferential direction of the spin housing 210.

The lower hollow body 213 may include a shielding region extending such that the rolling member 122A is covered by the shielding region and not visible from the side, and a contact region extending horizontally from the top of the shielding body and seated on the rolling member 122A.

The base through-hole 212 may be formed in a hollow shape in the contact body, and the lower hollow body 213 may be rotated along the plurality of rolling members 122A in a state in which the bottom surface of the contact body is in contact with the rolling member 122A. The base 100 may be disposed in the base through-hole 212, and more particularly, the spin body connecting portion 120 may be disposed therein.

The upper end 310A of the tilting housing 310 may be higher than the upper end 210A of the spin housing 210, and the tilting housing 310 may cover the upper end 210A of the spin housing 210. The lower end 310B of the tilting housing 310 may be lower than the upper end 210A of the spin housing 210 and may be higher than the lower end 2106 of the spin housing 210, and the tilting housing 310 may shield part of the outer circumference of the spin housing 210.

The tilting housing 310 may include a gap shielding portion (or gap shielding region) 310C covering or otherwise shielding a gap G1 between the tilting base 320 and the spin cover 220. The inner surface of the gap shielding portion 310C of the tilting housing 310 may face the gap G1 between the spin cover 220 and the tilting base 320, and shield the gap G1 from the outside of the gap G1.

When the tilting housing 310 includes the gap shielding portion 310C, various components (for example, the spin motor 260, the tilting driving gear 370, the tilting driven gear 380, and the PCB 230) disposed between the tilting base 320 and the spin cover 220 may be protected by the gap shielding portion 310C. The lower portion of the tilting housing 310 may surround the outer circumferential surface of the spin housing 210. The lower portion of the tilting housing 310 may overlap a portion including the upper end 210A of the spin housing 210 in the horizontal direction, and the upper end 210A of the spin housing 210 may be hidden by the tilting housing 310 so as to be invisible from the outside.

A gap G2 may be formed between the tilting housing 310 and the spin housing 210. The gap G2 may be formed between the inner circumferential surface of the tilting housing 310 and the outer circumferential surface of the spin housing 210.

The lower portion of the tilting housing 310 may have a shape in which the inner diameter thereof gradually decreases toward the lower side, and the lower end 310B of the tilting housing 310 may overlap the spin housing 210 in the vertical and horizontal directions. To this end, the lower end inner diameter D1 of the tilting housing 310 may be smaller than the upper end outer diameter D2 of the spin housing 210 and larger than the lower end outer diameter D3 of the spin housing 210.

The portion of the tilting housing 310 that overlaps the spin housing 210 in the vertical direction and the horizontal direction may be a spin housing shielding portion 310D that shields the spin housing 210. The spin housing shielding portion 310D may include a lower end 310B of the tilting housing 310. Due to the spin housing shielding portion 310D, foreign matters such as dust may be deterred from penetrated into the robot 1 through the gap G2 between the tilting housing 310 and the spin housing 210.

The tilting base 320 may be disposed across the upper space S3 formed inside the tilting housing 310. The tilting supporter 330 may be disposed at a position through which the rotational shaft OS of the spin body 200 passes. As previously described, the rotational shaft OS may be a virtual rotational axis.

When the first tilting housing 311 is the front tilting housing and the second tilting housing 312 is the rear tilting housing, the tilting supporter 330 may be disposed at the central portion of the tilting housing 310 with respect to the horizontal direction. When the first tilting housing 311 is the left tilting housing and the second tilting housing 312 is the right tilting housing, the tilting supporter 330 may be disposed at the central portion of the tilting housing 310 with respect to the front-rear direction. The reinforcing effect of the tilting housing 310 by the tilting supporter 330 may be further improved by the position of the tilting supporter 330.

The tilting supporter 330 may be disposed above the tilting base 320 and may be spaced apart from the tilting base 320 in the vertical direction. The tilting supporter 330 may be fastened to the upper portion of the tilting housing 310, and the tilting base 320 may be fastened to the lower portion of the tilting housing 310. In this configuration, the tilting base 320 may be a lower reinforcing member for reinforcing the lower strength of the tilting housing 310, and the tilting supporter 330 may be an upper reinforcing member for reinforcing the upper strength of the tilting housing 310. For example, the overall strength of the tilting housing 310 may be maintained by the tilting base 320 and the tilting supporter 330, and the tilting housing 310 may be operated stably during the spinning or tilting of the tilting housing 310.

The horizontal length L1 of the tilting supporter 330 may be shorter than the horizontal length L2 of the tilting base 320. For example, the front-rear length L1 of the tilting supporter 330 may be shorter than the front-rear length L2 of the tilting base 320. In this example, the front-rear distance between the second fastening portion 333 and the third fastening portion 335 of the tilting supporter 330 may be shorter than the front-rear distance between the first connecting portion 324 and the second connecting portion 325 of the tilting base 320. Since the tilting base 320 for reinforcing the lower portion of the tilting housing 310 is larger than the tilting supporter 330 for reinforcing the upper portion of the tilting housing 310, the geometrical stability of the tilting housing 310 may be secured.

In addition, the supporter fastening portions (or supporter fastening regions) 318A and 319A formed in the first tilting housing 311 may be further adjacent to the interface module 400 than the tilting base 320. For example, the supporter fastening portions 318A and 319A may be formed at positions relatively adjacent to the opening 313 and relatively far from the tilting base 320. In this configuration, the periphery of the opening 313, which is relatively vulnerable to damage, may be reinforced by the tilting supporter 330. The first supporter fastening portion 318A formed in the first tilting housing 311 may be fastened to the first fastening portion 331 of the tilting supporter 330, and the second supporter fastening portion 319A may be fastened to the second fastening portion 333 of the tilting supporter 330.

The first fastening portion 331 of the tilting supporter 330 may be further adjacent to the upper portion of the opening 313 than the lower portion of the opening 313, and the second fastening portion 333 of the tilting supporter 330 may be further adjacent to the lower portion of the opening 313 than the upper portion of the opening 313. Therefore, the periphery of the opening 313 may be uniformly reinforced. The third supporter fastening portion 319B formed in the second tilting housing 312 may be fastened to the third fastening portion 335 of the tilting supporter 330.

The height h3 between the bottom surface of the base 100 and the third fastening portion 335 may be lower than the height h1 between the bottom surface of the base 100 and the first fastening portion 331, and may be higher than the height h2 between the bottom surface of the base 100 and the second fastening portion 333. For example, the heights from the bottom surface of the base 100 to the fastening portions 331, 333, and 335 may be different from each other, and the tilting supporter 330 may be fastened to the tilting housing 310 at various heights, such that the reinforcing effect of the tilting supporter 330 may be improved.

In addition, on the basis of the virtual vertical plane P including the tilting shaft OT, the horizontal distance L5 between the virtual vertical plane P and the third fastening portion 335 may be longer than the horizontal distance L3 between the virtual vertical plane P and the first fastening portion 331 and may be shorter than the horizontal distance L4 between the virtual vertical plane P and the second fastening portion 333. In this example, the horizontal distances from the virtual vertical plane P passing through the tilting shaft OT to the fastening portions 331, 333, and 335 may be different from each other, and the tilting supporter 330 may be fastened to the tilting housing 310 at various positions with respect to the horizontal direction such that the reinforcing effect of the tilting supporter 330 may be improved.

As described above, the tilting supporter 330 may have a polygonal frame shape and may include, for example, the first, second, third, and fourth frames 330A, 330B, 330C, and 330D. In the support member 315 provided in the second tilting housing 312, the contact portion 315A may be brought into contact with the back surface of the first frame 330A so as to support the tilting supporter 330 in the front-rear direction. The contact portion 315A may be brought into contact with the upper portion of the first frame 330A.

The inclination of the fourth frame 330D may be identical to or similar to (e.g., with 10 degrees of) the inclination of the interface module 400 obliquely mounted on the first tilting housing 311. This configuration may prevent the interface module 400 and the tilting supporter 330 from interfering with each other and may secure the geometrical rigidity of the tilting supporter 330.

Furthermore, the first connecting portion 324 and the second connecting portion 325 of the tilting base may be disposed opposite to each other with respect to the virtual vertical plane P including the tilting shaft OT. For example, since the tilting base 320 and the tilting housing 310 may be fixed on opposite sides of the tilting shaft OT, the tilting operation may be stably performed.

According to embodiments, since the tilting supporter is connected to the inside of the first tilting housing and the inside of the second tilting housing, the fastening of the first tilting supporter and the second tilting supporter may be reinforced and the tilting housing may be reinforced, thereby resisting the external impact. In addition, since the tilting supporter is disposed at a position through which the virtual rotational axis of the spin body passes, the geometrical rigidity of the tilting housing and the tilting supporter may be increased.

In addition, since the tilting supporter is hidden by the first and second tilting housings and is invisible from the outside of the robot, the tilting supporter may not deteriorate the appearance design of the robot. In addition, since the tilting base is fixed to the inner lower portions of the first and second tilting housings, the lower portion of the tilting housing may be reinforced by the tilting base.

In addition, since the tilting supporter is disposed on the upper side of the tilting base, the upper portion of the tilting housing may be reinforced by the tilting supporter and the lower portion of the tilting housing may be reinforced by the tilting base. In addition, since the tilting supporter is spaced apart from the tilting base in the vertical direction, the tilting housing may be more uniformly reinforced with respect to the vertical direction.

In addition, since the horizontal length of the tilting supporter is shorter than the horizontal length of the tilting base, the geometrical stability of the tilting housing may be secured. In addition, since the tilting supporter has a polygonal frame shape, the tilting supporter has high geometrical rigidity while minimizing the weight of the tilting supporter, and it is possible to prevent the center of gravity of the robot from becoming excessively high due to the weight of the tilting supporter.

In addition, since the reinforcing ribs protruding inward from the inner circumference of the tilting supporter are formed in the tilting supporter, the rigidity of the tilting supporter may be further increased. In addition, since the supporter fastening portion formed in the first tilting housing is adjacent to the interface module rather than the tilting base, the periphery of the opening, which is relatively vulnerable to damage, may be reinforced by the tilting supporter.

In addition, since the number of the supporter fastening portions formed in the first tilting housing is larger than the number of the supporter fastening portions formed in the second tilting housing, the first tilting housing, which is vulnerable to damage due to the presence of the opening as compared with the second tilting housing, may be intensively reinforced. In addition, since the interface module is provided with the sub-supporter fastening portion to be fastened to the tilting supporter, the tilting supporter is fastened not only to the tilting housing but also to the interface module, thereby further reinforcing the structure of the robot.

In addition, since the first fastening portion of the tilting supporter is adjacent to the upper portion of the opening and the second fastening portion is adjacent to the lower portion of the opening, the periphery of the opening vulnerable to damage may be uniformly reinforced. In addition, since the tilting supporter and the first and second tilting housings are fastened at various heights, the reinforcing effect of the tilting supporter may be further increased.

In addition, since the tilting supporter and the first and second tilting housings are fastened at various positions with respect to the horizontal direction, the reinforcing effect of the tilting supporter may be further increased. In addition, since the tilting supporter includes the first, second, third, and fourth frames extending in mutually different directions, the stress acting on the tilting supporter may be uniformly transmitted to the first, second, third, and fourth frames, and the tilting supporter may have high geometrical rigidity.

In addition, the first tilting housing, which is relatively vulnerable to damage due to the presence of the opening, may be effectively reinforced by the third frame configured to increase the geometrical rigidity toward the first tilting housing. In addition, since the first connecting portion and the second connecting portion of the tilting base are disposed opposite to each other with respect to the virtual vertical plane including the tilting shaft, the tilting operation of the tilting body may be stably performed.

In addition, since at least one auxiliary connecting portion is further formed in the tilting base, the reinforcing effect of the first and second tilting housings by the tilting base may be further increased. In addition, since the tilting supporter is disposed at the center of the tilting housing with respect to the horizontal direction, the geometrical rigidity of the tilting housing and the tilting supporter may be increased.

Embodiments provide a robot having a rigid structure capable of withstanding an external impact. Embodiments also provide a robot having a high rigidity while minimizing a weight increase due to a reinforcing structure. Embodiments prevent the reinforcing structure from deteriorating the appearance of the robot in terms of design.

In a robot according to one embodiment, a tilting supporter that connects the inside of a first tilting housing and the inside of a second tilting housing may be disposed at a position through which a virtual rotational axis of a spin body passes. Therefore, the first tilting housing and the second tilting housing are reinforced by the tilting supporter, thereby providing high geometrical rigidity and preventing damage due to an external impact. In addition, since the tilting supporter is hidden by the first tilting housing and the second tilting housing and the robot is invisible from the outside, the appearance of the robot is not deteriorated in terms of design.

In one embodiment, a robot may include: a base; a spin body rotatably connected to the base; a tilting base tiltably connected to a tilting shaft connected to the spin body; a first tilting housing to which the tilting base is fixed therein; a second tilting housing which is fastened to the first tilting housing and to which the tilting base is fixed therein; and a tilting supporter connecting an inner side of the first tilting housing and an inner side of the second tilting housing, wherein the tilting supporter is disposed at a position through which a virtual rotational axis of the spin body passes.

The tilting base may be fixed to lower inner sides of the first tilting housing and the second tilting housing. Therefore, the lower portions of the first and second tilting housings may be reinforced by the tilting base. The tilting supporter may be disposed above the tilting base. Therefore, the upper portions of the first and second tilting housings may be reinforced by the tilting supporter, and the lower portions of the first and second tilting housings may be reinforced by the tilting base.

The tilting supporter may be vertically spaced apart from the tilting base. Therefore, the first and second tilting housings may be more uniformly reinforced with respect to the vertical direction. A horizontal length of the tilting supporter may be shorter than a horizontal length of the tilting base. Therefore, since the size of the tilting base fixed to the lower side is larger than the size of the tilting supporter fixed to the upper side, the geometrical stability of the tilting housing may be secured.

The tilting supporter may have a polygonal frame shape. Therefore, it is possible to obtain high geometrical rigidity while minimizing the weight of the tilting supporter, and it is possible to minimize the center of gravity of the robot due to the weight of the tilting supporter. The tilting supporter may be provided with a reinforcing rib protruding inward from an inner circumference of the tilting supporter. Therefore, the rigidity of the tilting supporter may be further increased.

The first tilting housing may include: an opening in which the interface module is mounted; and at least one supporter fastening portion fastened to the tilting supporter and further adjacent to the interface module than the tilting base. Therefore, the periphery of the opening, which is relatively vulnerable to damage, may be reinforced by the tilting supporter.

At least one supporter fastening portion to be fastened to the tilting supporter may be formed in the second tilting housing, and the number of supporter fastening portions formed in the first tilting housing may be larger than the number of supporter fastening portions formed in the second tilting housing. Therefore, the first tilting housing, which is vulnerable to damage due to the presence of the opening as compared with the second tilting housing, may be intensively reinforced.

The interface module may include a sub-supporter fastening portion to be fastened to the tilting supporter. Therefore, since the tilting supporter is fastened to not only the tilting housing but also the interface module, the structure of the robot may be further strengthened.

The first tilting housing may include an opening through which the interface module is mounted, and the tilting supporter may include: a first fastening portion fastened to the first tilting housing and further adjacent to an upper portion of the opening than a lower portion of the opening; a second fastening portion fastened to the first tilting housing and further adjacent to the lower portion of the opening than the upper portion of the opening; and a third fastening portion to be fastened to the second tilting housing. Therefore, the periphery of the opening, which is vulnerable to damage, may be uniformly reinforced by the first and second fastening portions.

A height between the bottom surface of the base and the third fastening portion may be lower than a height between the bottom surface of the base and the first fastening portion and may be higher than a height between the bottom surface of the base and the second fastening portion. Therefore, the tilting supporter and the first and second tilting housings may be fastened at various heights, and the reinforcing effect of the tilting supporter may be increased.

On the basis of a virtual vertical plane including the tilting shaft, a horizontal distance between the virtual vertical plane and the third fastening portion may be longer than a horizontal distance between the virtual vertical plane and the first fastening portion and may be shorter than a horizontal distance between the virtual vertical plane and the second fastening portion. Therefore, the tilting supporter and the first and second tilting housings may be fastened at various positions with respect to the horizontal direction, and the reinforcing effect of the tilting supporter may be increased.

The tilting supporter may include: a first frame extending in a vertical direction and having the third fastening portion formed therein; a second frame extending from the upper end of the first frame toward the first tilting housing and having the first fastening portion formed therein; a third frame extending parallel to the second frame at a lower end of the first frame and having the second fastening portion formed therein; and a fourth frame connecting an end of the second frame and an end of the third frame. Therefore, the stress acting on the tilting supporter may be uniformly transmitted to the first, second, third, and fourth frames, and the tilting supporter may have high geometrical rigidity.

The third frame may include: a horizontal portion having a horizontal width increasing toward the first tilting housing; and a vertical portion vertically protruding from the horizontal portion and having a vertical height increasing toward the first tilting housing. Therefore, as the tilting supporter gets closer to the first tilting housing, the geometrical rigidity may be increased, and the first tilting housing, which is relatively vulnerable to impact due to the presence of the opening, may be effectively reinforced.

The tilting base may include: a first connecting portion provided at one side of the tilting base and connected to the inside of the first tilting housing; and a second connecting portion provided at the other side of the tilting base and connected to the inside of the second tilting housing.

The first connecting portion and the second connecting portion may be disposed opposite to each other with respect to a virtual vertical plane including the tilting shaft. Therefore, since the tilting base and the first and second tilting housings are fixed to each other on opposite sides of the tilting shaft, the tilting operation of the robot may be stably performed.

The tilting base may further include at least one auxiliary connecting portion disposed between the first connecting portion and the second connecting portion with respect to a circumferential direction of the tilting base and fixed to the inside of the first tilting housing or the second tilting housing. Therefore, the reinforcing effect of the first and second tilting housings by the tilting base may be further increased.

In the robot according to one embodiment, the tilting supporter that connects the inside of the first tilting housing and the inside of the second tilting housing fastened to the rear side of the first tilting housing may be disposed at the center of the tilting housing with respect to the horizontal direction. Therefore, the tilting housing is reinforced by the tilting supporter, thereby providing high geometrical rigidity and preventing damage due to an external impact. In addition, since the tilting supporter is disposed inside the tilting housing and is invisible from the outside of the robot, the appearance of the robot is not deteriorated in terms of design.

In one embodiment, a robot may include: a base; a spin body rotatably connected to the base; a tilting base tiltably connected to a tilting shaft connected to the spin body; a tilting housing including a first tilting housing and a second tilting housing fastened to the first tilting housing at a rear side of the first tilting housing, wherein the tilting base is fixed to the inside thereof; and a tilting supporter connecting the inside of the first tilting housing and the inside of the second tilting housing and extending in a front-rear direction, wherein the tilting supporter is disposed at a central portion of the tilting housing with respect to a horizontal direction.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a base;
a lower housing rotatably connected to the base;
a plate tiltably connected to the lower housing at a tilt shaft;
a first upper housing to which the plate is coupled;
a second upper housing coupled to the first upper housing and the plate; and
a support frame connected to an inner surface of the first upper housing and an inner surface of the second upper housing,
wherein the support frame is positioned such that an axis of rotation for the lower housing relative to the base passes through the support frame.

2. The robot according to claim 1, wherein the plate is coupled to the inner surface of the first upper housing and the inner surface of the second upper housing.

3. The robot according to claim 1, wherein the support frame is positioned above the plate.

4. The robot according to claim 3, wherein the support frame is vertically spaced apart from the plate.

5. The robot according to claim 1, wherein a maximum horizontal length of the support frame is less than a maximum horizontal length of the plate.

6. The robot according to claim 1, wherein the support frame has a polygonal shape that defines a cavity.

7. The robot according to claim 6, wherein the support frame includes a reinforcing rib that protrudes inward from an inner circumference surface of the support frame.

8. The robot according to claim 1, wherein the first upper housing includes:
an opening in which an interface module is mounted; and
at least one first support frame fastening boss fastened to the support frame, the at least one first support frame fastening boss of the first upper housing being positioned closer to the interface module than the plate.

9. The robot according to claim 8, wherein
the second upper housing includes at least one second support frame fastening boss to be fastened to the support frame, and
a quantity of the at least one first support frame fastening boss formed in the first upper housing is larger than a quantity of the at least one second support frame fastening boss formed in the second upper housing.

10. The robot according to claim 8, wherein the interface module includes an interface case configured to be fastened to the support frame.

11. The robot according to claim 1, wherein the first upper housing includes an opening through which an interface module is mounted, and
the support frame includes:
a first fastening portion configured to be fastened to the first upper housing positioned closer to an upper region of the opening than a lower region of the opening;
a second fastening portion configured to be fastened to the first upper housing and positioned closer to the lower region of the opening than the upper region of the opening; and
a third fastening portion configured to be fastened to the second upper housing.

12. The robot according to claim 11, wherein a height between a bottom surface of the base and the third fastening portion is less than a height between the bottom surface of the base and the first fastening portion and is greater than a height between the bottom surface of the base and the second fastening portion.

13. The robot according to claim 11, wherein:
a vertical plane extends through the tilt shaft, and
a horizontal distance between the vertical plane and the third fastening portion is greater than a horizontal distance between the vertical plane and the first fastening portion and is less than a horizontal distance between the vertical plane and the second fastening portion.

14. The robot according to claim 11, wherein the support frame includes:
- a first frame section extending in a vertical direction and having the third fastening portion formed therein;
- a second frame section extending from the upper end of the first frame toward the first upper housing and having the first fastening portion formed therein;
- a third frame section extending parallel to the second frame section at a lower end of the first frame section and having the second fastening portion formed therein; and
- a fourth frame section connecting an end of the second frame section and an end of the third frame section.

15. The robot according to claim 14, wherein the third frame section includes:
- a horizontal plate having a horizontal width increasing toward the first upper housing; and
- a vertical plate vertically protruding from the horizontal plate and having a vertical height increasing toward the first upper housing.

16. The robot according to claim 1, wherein the plate includes:
- a first connecting portion provided at a first side of the plate and connected to the inner surface of the first upper housing; and
- a second connecting portion provided at a second side of the plate and connected to the inner surface of the second upper housing,
- wherein the first connecting portion includes at least one of a first housing fixing rib fitted and fixed to the inner surface of the first upper housing or a first housing fixing boss fastened to the inner surface of the first upper housing, and
- wherein the second connecting portion includes at least one of a second housing fixing rib fitted and fixed to the inner surface of the second upper housing or a second housing fixing boss fastened to the inner surface of the second upper housing.

17. The robot according to claim 16, wherein the first connecting portion and the second connecting portion are positioned opposite to each other with respect to a vertical plane that extends through the tilt shaft.

18. The robot according to claim 16, wherein the plate further includes at least one auxiliary connecting portion positioned between the first connecting portion and the second connecting portion with respect to a circumferential direction of the plate and fixed to at least one of the inner surface of the first upper housing or the inner surface of the second upper housing,
- wherein the at least one auxiliary connecting portion includes at least one of:
  - an auxiliary housing fixing portion rib fitted and fixed to the inner surface of the first upper housing or the inner surface of the second upper housing, or
  - an auxiliary housing fastening loop fastened to the inner surface of the first upper housing or the inner surface of the second upper housing by a fastening member.

19. A robot comprising:
- a base;
- a lower housing rotatably connected to the base;
- a plate tiltably connected to the lower housing at a tilt shaft;
- an upper housing including a first upper housing, and a second upper housing fastened to the first upper housing at a rear side of the first upper housing, wherein the plate is positioned in an interior of the upper housing; and
- a support frame coupled to an inside surface of the first upper housing and an inside surface of the second upper housing, and extending in a horizontal direction between the first upper housing and the second upper housing,
- wherein a portion of the support frame is positioned at a midpoint of the upper housing with respect to the horizontal direction between the first upper housing and the second upper housing.

20. The robot according to claim 19, wherein the support frame is positioned above the plate.

* * * * *